US012361866B2

(12) United States Patent
Hwang et al.

(10) Patent No.: US 12,361,866 B2
(45) **Date of Patent: *Jul. 15, 2025**

(54) DISPLAY DEVICE HAVING A PIXEL DRIVER WITH PULSE WIDTH MODULATION AND PULSE AMPLITUDE MODULATION SIGNALS

(71) Applicant: Samsung Display Co., LTD., Yongin-si (KR)

(72) Inventors: Jung Hwan Hwang, Seongnam-si (KR); Hyun Joon Kim, Hwaseong-si (KR); Kye Uk Lee, Seoul (KR); Sang Jin Jeon, Hwaseong-si (KR); Jun Ki Jeong, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/528,761

(22) Filed: Dec. 4, 2023

(65) Prior Publication Data

US 2024/0112626 A1 Apr. 4, 2024

Related U.S. Application Data

(63) Continuation of application No. 17/807,690, filed on Jun. 17, 2022, now Pat. No. 11,837,156.

(30) Foreign Application Priority Data

Oct. 19, 2021 (KR) ........................ 10-2021-0138934

(51) Int. Cl.
*G09G 3/32* (2016.01)

(52) U.S. Cl.
CPC ....... *G09G 3/32* (2013.01); *G09G 2320/0633* (2013.01)

(58) Field of Classification Search
CPC ........................................................ G09G 3/32
(Continued)

(56) References Cited

U.S. PATENT DOCUMENTS

| | | | |
|---|---|---|---|
| 10,713,996 B2 | 7/2020 | Kim et al. | |
| 2019/0371231 A1* | 12/2019 | Kim .................... | G09G 3/2003 |

(Continued)

FOREIGN PATENT DOCUMENTS

| | | |
|---|---|---|
| KR | 2019-0136882 A | 12/2019 |
| KR | 2020-0038735 A | 4/2020 |

(Continued)

*Primary Examiner* — Long D Pham
(74) *Attorney, Agent, or Firm* — Womble Bond Dickinson (US) LLP

(57) ABSTRACT

A display device includes a scan write line, a PWM emission line, a PAM emission line, a sweep signal line, a first data line, a second data line, and a subpixel connected thereto, and including a light emitting element, a first pixel driver to supply a control current to a node according to the first data voltage in response to the PWM emission signal, a second pixel driver to generate a driving current according to the second data voltage in response to the PWM emission signal, and a third pixel driver to supply the driving current to the light emitting element according to the PAM emission signal and a voltage of the node, wherein the PWM emission signal includes a plurality of PWM pulses, the PAM emission signal includes a plurality of PAM pulses, and a number of the PWM pulses is greater than a number of the PAM pulses.

19 Claims, 21 Drawing Sheets

(58) Field of Classification Search
USPC ............................................................ 345/55
See application file for complete search history.

(56) References Cited

U.S. PATENT DOCUMENTS

| | | | |
|---|---|---|---|
| 2020/0111403 | A1 | 4/2020 | Kim et al. |
| 2020/0394953 | A1 | 12/2020 | Kim et al. |
| 2021/0210002 | A1 | 7/2021 | Kim et al. |
| 2022/0101783 | A1 | 3/2022 | Han et al. |

FOREIGN PATENT DOCUMENTS

| | | | |
|---|---|---|---|
| KR | 2020-0038741 | A | 4/2020 |
| KR | 2020-0114980 | A | 10/2020 |
| KR | 2021-0087873 | A | 7/2021 |

* cited by examiner

DISPLAY DEVICE HAVING A PIXEL DRIVER WITH PULSE WIDTH MODULATION AND PULSE AMPLITUDE MODULATION SIGNALS

CROSS-REFERENCE TO RELATED APPLICATIONS

This application is a continuation of U.S. patent application Ser. No. 17/807,690, filed Jun. 17, 2022, which claims priority to and the benefit of Korean Patent Application No. 10-2021-0138934, filed Oct. 19, 2021, the entire content of both of which is incorporated herein by reference.

BACKGROUND

1. Field

The present disclosure relates to a display device.

2. Description of the Related Art

As the information society develops, demands for display devices for displaying images are increasing in various forms. The display devices may be flat panel display devices, such as liquid crystal display devices, field emission display devices, and light emitting display devices.

The light emitting display devices may include organic light emitting display devices including an organic light emitting diode element as a light emitting element, or light emitting diode display devices including an inorganic light emitting diode element, such as a light emitting diode as a light emitting element. An organic light emitting display device adjusts the luminance or grayscale level of light emitted from an organic light emitting diode element by adjusting the magnitude of a driving current applied to the organic light emitting diode element. However, because the wavelength of light emitted from an inorganic light emitting diode element varies according to the driving current, image quality may deteriorate if the inorganic light emitting diode element is driven in the same manner as the organic light emitting diode element.

SUMMARY

Aspects of some embodiments of the present disclosure provide a display device which may reduce or prevent deterioration of image quality due to a change in the wavelength of light emitted from an inorganic light emitting diode element according to a driving current applied to the inorganic light emitting diode element.

However, embodiments of the present disclosure are not limited to those set forth herein. The above and other embodiments of the present disclosure will become more apparent to one of ordinary skill in the art to which the present disclosure pertains by referencing the detailed description of the present disclosure given below.

According to some embodiments of the present disclosure, there is provided a display device including a scan write line configured to receive a scan write signal, a pulse width modulation (PWM) emission line configured to receive a PWM emission signal, a pulse amplitude modulation (PAM) emission line configured to receive a PAM emission signal, a sweep signal line configured to receive a sweep signal, a first data line configured to receive a first data voltage, a second data line configured to receive a second data voltage, and a subpixel connected to the scan write line, the PWM emission line, the PAM emission line, the sweep signal line, the first data line, and the second data line, and including a light emitting element, a first pixel driver that is configured to supply a control current to a node according to the first data voltage in response to the PWM emission signal, a second pixel driver that is configured to generate a driving current according to the second data voltage in response to the PWM emission signal, and a third pixel driver that is configured to supply the driving current to the light emitting element according to the PAM emission signal and a voltage of the node, wherein the PWM emission signal includes a plurality of PWM pulses generated during one frame period, wherein the PAM emission signal includes a plurality of PAM pulses generated during the one frame period, and wherein a number of the PWM pulses is greater than a number of the PAM pulses.

A first PWM pulse among the PWM pulses might not overlap the PAM pulses.

PWM pulses other than the first PWM pulse among the PWM pulses may respectively overlap the PAM pulses.

A pulse width of each of the PWM pulses may be greater than a pulse width of each of the PAM pulses.

The light emitting element might not emit light during a period in which a first PWM pulse is generated.

The sweep signal may include a plurality of sweep pulses generated during the one frame period, wherein each of the sweep pulses linearly changes from a gate-off voltage to a gate-on voltage.

A first sweep pulse among the sweep pulses might not overlap the PAM pulses.

Sweep pulses other than the first sweep pulse among the sweep pulses may respectively overlap the PAM pulses.

A number of the sweep pulses may be greater than the number of the PAM pulses.

A pulse width of each of the sweep pulses may be the same as the pulse width of each of the PAM pulses.

A pulse width of each of the sweep pulses may be less than the pulse width of each of the PWM pulses.

The light emitting element might not emit light during a period in which the first sweep pulse is generated.

According to some embodiments of the present disclosure, there is provided a display device including a PWM emission line configured to receive a PWM emission signal, a PAM emission line configured to receive a PAM emission signal, a sweep signal line configured to receive a sweep signal, a first data line configured to receive a first data voltage, a second data line configured to receive a second data voltage, and a subpixel connected to the PWM emission line, the PAM emission line, the sweep signal line, the first data line, and the second data line, wherein one frame period includes an address period in which the first data voltage and the second data voltage are supplied to the subpixel, a dummy emission period in which a light emitting element of the subpixel does not emit light, and during which the PWM emission signal has a PWM pulse generated as a gate-on voltage, and the PAM emission signal has a gate-off voltage, and a first emission period in which the light emitting element of the subpixel emits light.

During the first emission period, the PWM emission signal may have the PWM pulse, and the PAM emission signal has a PAM pulse generated as the gate-on voltage.

During the first emission period, a pulse width of the PWM pulse may be greater than a pulse width of the PAM pulse.

During the dummy emission period, the sweep signal may have a sweep pulse that linearly changes from the gate-off voltage to the gate-on voltage.

During the dummy emission period, a pulse width of the sweep pulse may be less than the pulse width of the PWM pulse.

During the first emission period, the sweep signal may have a sweep pulse that linearly changes from the gate-off voltage to the gate-on voltage.

During the first emission period, a pulse width of the sweep pulse may be the same as a pulse width of the PAM pulse.

The subpixel may include a first pixel driver that is configured to supply a control current to a third node according to the first data voltage in response to the PWM emission signal, a second pixel driver that is configured to generate a driving current according to the second data voltage in response to the PWM emission signal, and a third pixel driver that is configured to supply the driving current to the light emitting element according to the PAM emission signal and a voltage of the third node.

The display device may further include a scan write line configured to receive a scan write signal, a scan initialization line configured to receive a scan initialization signal, a scan control line configured to receive a scan control signal, an initialization voltage line configured to receive an initialization voltage, and a first power line configured to receive a first power supply voltage, wherein the first pixel driver includes a first transistor that is configured to generate the control current according to the first data voltage, a second transistor that is configured to apply the first data voltage of the first data line to a first electrode of the first transistor according to the scan write signal, a third transistor that is configured to apply the initialization voltage of the initialization voltage line to a gate electrode of the first transistor according to the scan initialization signal, a fourth transistor that is configured to connect the gate electrode and a second electrode of the first transistor according to the scan write signal, a fifth transistor that is configured to connect the first power line to the first electrode of the first transistor according to the PWM emission signal, a sixth transistor that is configured to connect the second electrode of the first transistor to the third node according to the PWM emission signal, a seventh transistor that is configured to connect the sweep signal line to a gate-off voltage line according to the scan control signal, and a first capacitor between the sweep signal line and the gate electrode of the first transistor.

The display device may further include a scan write line configured to receive a scan write signal, a scan initialization line configured to receive a scan initialization signal, a scan control line configured to receive a scan control signal, a first power line configured to receive a first power supply voltage, a second power line configured to receive a second power supply voltage, and an initialization voltage line configured to receive an initialization voltage, wherein the second pixel driver includes an eighth transistor that is configured to generate the driving current according to the second data voltage, a ninth transistor that is configured to apply the second data voltage of the second data line to a first electrode of the eighth transistor according to the scan write signal, a tenth transistor that is configured to apply the initialization voltage of the initialization voltage line to a gate electrode of the eighth transistor according to the scan initialization signal, an eleventh transistor that is configured to connect the gate electrode and a second electrode of the eighth transistor according to the scan write signal, a twelfth transistor that is configured to connect the second power line to a first electrode of the ninth transistor according to the PWM emission signal, a thirteenth transistor that is configured to connect the first power line to a second node according to the scan control signal, a fourteenth transistor that is configured to connect the second power line to the second node according to the PWM emission signal, and a second capacitor between a gate electrode of the eighth transistor and the second node.

The display device may further include a scan control line configured to receive a scan control signal, an initialization voltage line configured to receive an initialization voltage, and a third power line configured to receive a third power supply voltage, wherein the third pixel driver includes a fifteenth transistor that includes a gate electrode connected to a third node, a sixteenth transistor that is configured to connect the third node to the initialization voltage line according to the scan control signal, a seventeenth transistor that is configured to connect a second electrode of the fifteenth transistor to a first electrode of the light emitting element according to the PAM emission signal, an eighteenth transistor that is configured to connect the first electrode of the light emitting element to the initialization voltage line according to the scan control signal, and a third capacitor between the third node and the initialization voltage line.

According to the aforementioned and other embodiments of the present disclosure, the luminance of light emitted from an inorganic light emitting diode element may be controlled by adjusting a period during which a driving current is applied while maintaining the driving current applied to the inorganic light emitting diode element constant. Therefore, it is possible to reduce or prevent deterioration of image quality due to a change in the wavelength of light emitted from the inorganic light emitting diode element according to the driving current applied to the inorganic light emitting diode element.

According to the aforementioned and other embodiments of the present disclosure, a dummy emission period in which a light emitting element does not emit light is added between an address period and a first emission period. Therefore, after the voltage of a second electrode of a first transistor increases to "Vdata+Vth1" during the address period, it is possible to reduce or prevent the likelihood of the second electrode of the first transistor being connected to a gate electrode of a fifteenth transistor during the first emission period, and thus causing an increase in the voltage of the gate electrode of the fifteenth transistor. That is, because the voltage of the second electrode of the first transistor increases to "Vdata+Vth1" during the address period, the voltage of the gate electrode of the fifteenth transistor increases during the dummy emission period, not the first emission period. However, during the dummy emission period, due to the turn-off of a seventeenth transistor, a driving current is not supplied to the light emitting element. Therefore, the luminance of the light emitting element during the first emission period is lower than the luminance of the light emitting element during a second emission period. Accordingly, it is possible to reduce or prevent the likelihood of a step efficiency, in which the luminance of the light emitting element increases in a stepwise manner, occurring in the first emission period and the second emission period. That is, the step efficiency may be improved.

BRIEF DESCRIPTION OF THE DRAWINGS

The above and other embodiments and features of the present disclosure will become more apparent by describing embodiments thereof with reference to the attached drawings, in which.

DETAILED DESCRIPTION

Figure 1:
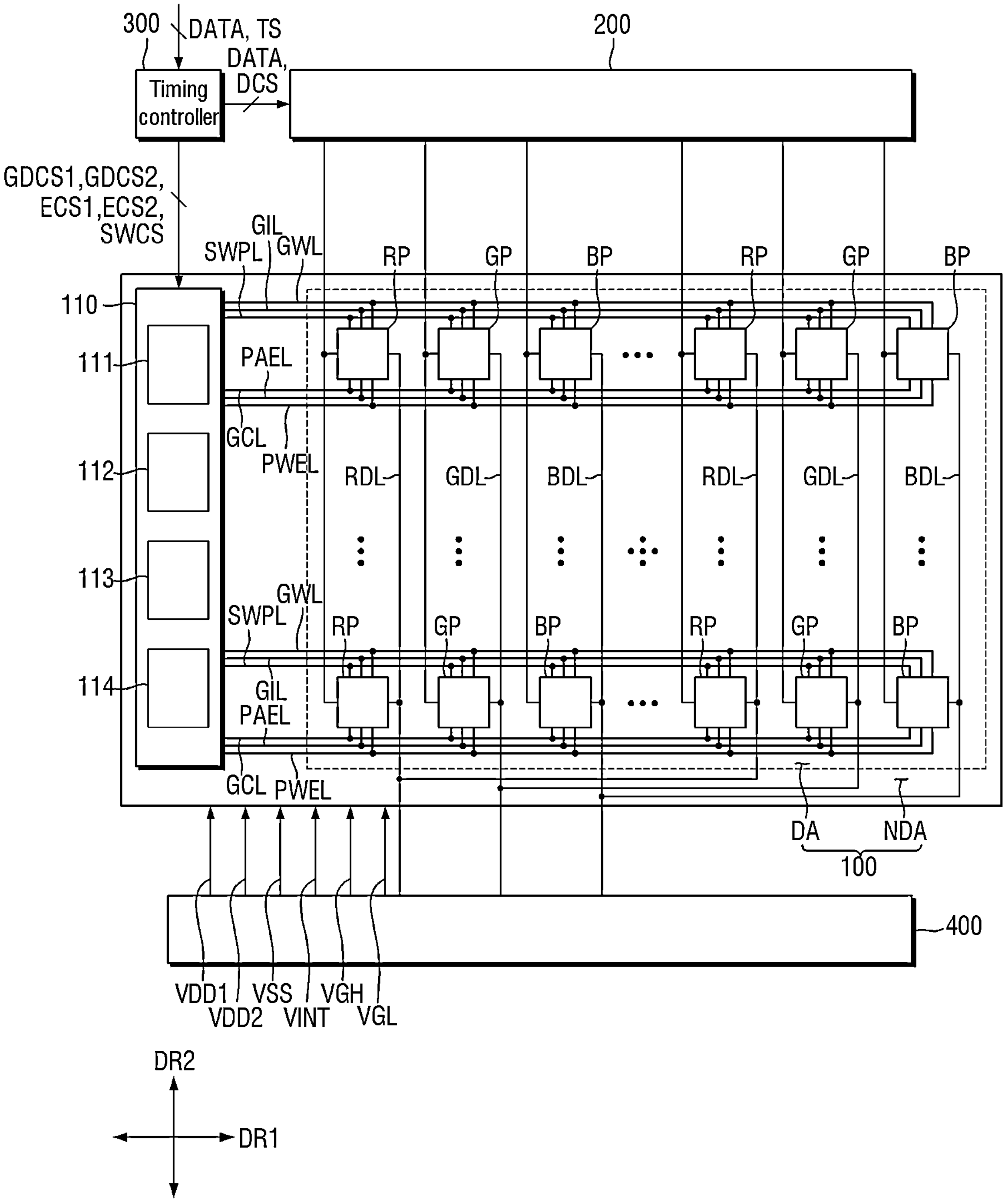
FIG. 1 is a block diagram of a display device according to one or more embodiments.

Aspects of some embodiments of the present disclosure and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects of the present disclosure to those skilled in the art. Accordingly, processes, elements, and techniques that are not necessary to those having ordinary skill in the art for a complete understanding of the aspects of the present disclosure might not be described.

Unless otherwise noted, like reference numerals, characters, or combinations thereof denote like elements throughout the attached drawings and the written description, and thus, descriptions thereof will not be repeated. Further, parts not related to the description of some embodiments might not be shown to make the description clear.

In the drawings, the relative sizes of elements, layers, and regions may be exaggerated for clarity. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form to avoid unnecessarily obscuring various embodiments.

Spatially relative terms, such as “beneath,” “below,” “lower,” “under,” “above,” “upper,” and the like, may be used herein for ease of explanation to describe one element or feature’s relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as “below” or “beneath” or “under” other elements or features would then be oriented “above” the other elements or features. Thus, the example terms “below” and “under” can encompass both an orientation of above and below. The device may be otherwise oriented (e.g., rotated 90 degrees or at other orientations) and the spatially relative descriptors used herein should be interpreted accordingly. Similarly, when a first part is described as being arranged “on” a second part, this indicates that the first part is arranged at an upper side or a lower side of the second part without the limitation to the upper side thereof on the basis of the gravity direction.

Further, in this specification, the phrase “on a plane,” or “plan view,” means viewing a target portion from the top, and the phrase “on a cross-section” means viewing a cross-section formed by vertically cutting a target portion from the side.

It will be understood that when an element, layer, region, or component is referred to as being “formed on,” “on,” “connected to,” or “coupled to” another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. For example, when a layer, region, or component is referred to as being “electrically connected” or “electrically coupled” to another layer, region, or component, it can be directly electrically connected or coupled to the other layer, region, and/or component or intervening layers, regions, or components may be present. However, “directly connected/directly coupled” refers to one component directly connecting or coupling another component without an intermediate component. Meanwhile, other expressions describing relationships between components such as “between,” “immediately between” or “adjacent to” and “directly adjacent to” may be construed similarly. In addition, it will also be understood that when an element or layer is referred to as being “between” two elements or layers, it can be the only element or layer between the two elements or layers, or one or more intervening elements or layers may also be present.

For the purposes of this disclosure, expressions such as “at least one of,” when preceding a list of elements, modify the entire list of elements and do not modify the individual elements of the list. For example, “at least one of X, Y, and Z,” “at least one of X, Y, or Z,” and “at least one selected from the group consisting of X, Y, and Z” may be construed as X only, Y only, Z only, any combination of two or more of X, Y, and Z, such as, for instance, XYZ, XYY, YZ, and ZZ, or any variation thereof. Similarly, the expression such as “at least one of A and B” may include A, B, or A and B. As used herein, the term “and/or” includes any and all combinations of one or more of the associated listed items. For example, the expression such as “A and/or B” may include A, B, or A and B.

It will be understood that, although the terms “first,” “second,” “third,” etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing particular embodiments only and is not intended to be limiting of the present disclosure. As used herein, the singular forms “a” and “an” are intended to include the plural forms as well, unless the context clearly indicates otherwise. It will be further understood that the terms “comprises,” “comprising,” “have,” “having,” “includes,” and “including,” when used in this specification, specify the presence of the stated features, integers, steps, operations, elements, and/or components, but do not preclude the presence or addition of one or more other features, integers, steps, operations, elements, components, and/or groups thereof.

As used herein, the term “substantially,” “about,” “approximately,” and similar terms are used as terms of approximation and not as terms of degree, and are intended to account for the inherent deviations in measured or calculated values that would be recognized by those of ordinary skill in the art. “About” or “approximately,” as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, “about” may mean within one or more standard deviations, or within ±30%, 20%, 10%, 5% of the stated value. Further, the use of “may” when describing embodiments of the present disclosure refers to “one or more embodiments of the present disclosure.”

When one or more embodiments may be implemented differently, a specific process order may be performed differently from the described order. For example, two consecutively described processes may be performed substantially at the same time or performed in an order opposite to the described order.

Also, any numerical range disclosed and/or recited herein is intended to include all sub-ranges of the same numerical precision subsumed within the recited range. For example, a range of “1.0 to 10.0” is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of some embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a block diagram of a display device 10 according to one or more embodiments.

Referring to FIG. 1, the display device 10 includes a display panel 100, a scan driver 110, a source driver 200, a timing controller 300, and a power supply unit 400.

A display area DA of the display panel 100 may include subpixels RP, GP, and BP displaying an image and scan write lines GWL, scan initialization lines GIL, scan control lines GCL, sweep signal lines SWPL, pulse width modulation (PWM) emission lines PWEL, pulse amplitude modulation (PAM) emission lines PAEL, PWM data lines DL, first PAM data lines RDL, second PAM data lines GDL, and third PAM data lines BDL connected to the subpixels RP, GP, and BP.

The scan write lines GWL, the scan initialization lines GIL, the scan control lines GCL, the sweep signal lines SWPL, the PWM emission lines PWEL, and the PAM emission lines PAEL may extend in a first direction (X-axis direction), and may be arranged in a second direction (Y-axis direction) intersecting the first direction (X-axis direction). The PWM data lines DL, the first PAM data lines RDL, the second PAM data lines GDL, and the third PAM data lines BDL may extend in the second direction (Y-axis direction), and may be arranged in the first direction (X-axis direction). The first PAM data lines RDL may be electrically connected to each other, the second PAM data lines GDL may be electrically connected to each other, and the third PAM data lines BDL may be electrically connected to each other.

The subpixels RP, GP, and BP may include first subpixels RP for emitting first light, second subpixels GP for emitting second light, and third subpixels BP for emitting third light. The first light refers to light in a red wavelength band, the second light refers to light in a green wavelength band, and the third light refers to light in a blue wavelength band. For example, a main peak wavelength of the first light may be located in the range of about 600 nm to about 750 nm, a main peak wavelength of the second light may be located in the range of about 480 nm to about 560 nm, and a main peak wavelength of the third light may be located in the range of about 370 nm to about 460 nm.

Each of the subpixels RP, GP, and BP may be connected to any one of the scan write lines GWL, any one of the scan initialization lines GIL, any one of the scan control lines GCL, any one of the sweep signal lines SWPL, any one of the PWM emission lines PWEL, and any one of the PAM emission lines PAEL. In addition, each of the first subpixels RP may be connected to any one of the PWM data lines DL and any one of the first PAM data lines RDL. In addition, each of the second subpixels GP may be connected to any one of the PWM data lines DL and any one of the second PAM data lines GDL. In addition, each of the third subpixels BP may be connected to any one of the PWM data lines DL and any one of the third PAM data lines BDL.

In a non-display area NDA of the display panel 100, the scan driver 110 for transmitting signals to the scan write lines GWL, the scan initialization lines GIL, the scan control lines GCL, the sweep signal lines SWPL, the PWM emission lines PWEL, and the PAM emission lines PAEL may be located. Although the scan driver 110 is located on one edge of the display panel 100 in FIG. 1, embodiments of the present specification are not limited thereto. The scan driver 110 may also be located on both edges of the display panel 100.

The scan driver 110 may include a first scan signal driver 111, a second scan signal driver 112, a sweep signal driver 113, and an emission signal driver 114.

The first scan signal driver 111 may receive a first scan driving control signal GDCS1 from the timing controller 300. The first scan signal driver 111 may output scan initialization signals to the scan initialization lines GIL and output scan write signals to the scan write lines GWL according to the first scan driving control signal GDCS1. That is, the first scan signal driver 111 may output two scan signals, that is, the scan initialization signals and the scan write signals together.

The second scan signal driver 112 may receive a second scan driving control signal GDCS2 from the timing controller 300. The second scan signal driver 112 may output scan control signals to the scan control lines GCL according to the second scan driving control signal GDCS2.

The sweep signal driver 113 may receive a first emission control signal ECS1 and a sweep control signal SWCS from the timing controller 300. The sweep signal driver 113 may output PWM emission signals to the PWM emission lines PWEL and output sweep signals to the sweep signal lines SWPL according to the first emission control signal ECS1. That is, the sweep signal driver 113 may output the PWM emission signals and the sweep signals together.

The emission signal driver 114 may receive a second emission control signal ECS2 from the timing controller 300. The emission signal driver 114 may output PAM emission signals to the PAM emission lines PAEL according to the second emission control signal ECS2.

The timing controller 300 receives digital video data DATA and timing signals TS. The timing controller 300 may generate the first scan driving control signal GDCS1, the second scan driving control signal GDCS2, the first emission control signal ECS1, the second emission control signal ECS2, and the sweep control signal SWCS for controlling the operation timing of the scan driver 110 according to the timing signals TS. In addition, the timing controller 300 may generate a data control signal DCS for controlling the operation timing of the source driver 200.

The timing controller 300 outputs the first scan driving control signal GDCS1, the second scan driving control signal GDCS2, the first emission control signal ECS1, the second emission control signal ECS2, and the sweep control signal SWCS to the scan driver 110. The timing controller 300 outputs the digital video data DATA and the data control signal DCS to the source driver 200.

The source driver 200 converts the digital video data DATA into analog data voltages, and outputs the analog data voltages to the PWM data lines DL. Therefore, the subpixels RP, GP, and BP may be selected by the scan write signals of the scan driver 110, and the data voltages may be supplied to the selected subpixels RP, GP, and BP.

The power supply unit 400 may output a first PAM data voltage commonly to the first PAM data lines RDL, output a second PAM data voltage commonly to the second PAM data lines GDL, and output a third PAM data voltage commonly to the third PAM data lines BDL. In addition, the power supply unit 400 may generate a plurality of power supply voltages and output the power supply voltages to the display panel 100.

The power supply unit 400 may output a first power supply voltage VDD1, a second power supply voltage VDD2, a third power supply voltage VSS, an initialization voltage VINT, a gate-on voltage VGL, and a gate-off voltage VGH to the display panel 100. The first power supply voltage VDD1 and the second power supply voltage VDD2 may be high-potential driving voltages for driving a light emitting element of each of the subpixels RP, GP, and BP. The third power supply voltage VSS may be a low-potential driving voltage for driving the light emitting element of each of the subpixels RP, GP, and BP. The initialization voltage VINT and the gate-off voltage VGH may be applied to each of the subpixels RP, GP, and BP, and the gate-on voltage VGL and the gate-off voltage VGH may be applied to the scan driver 110.

Figure 2:
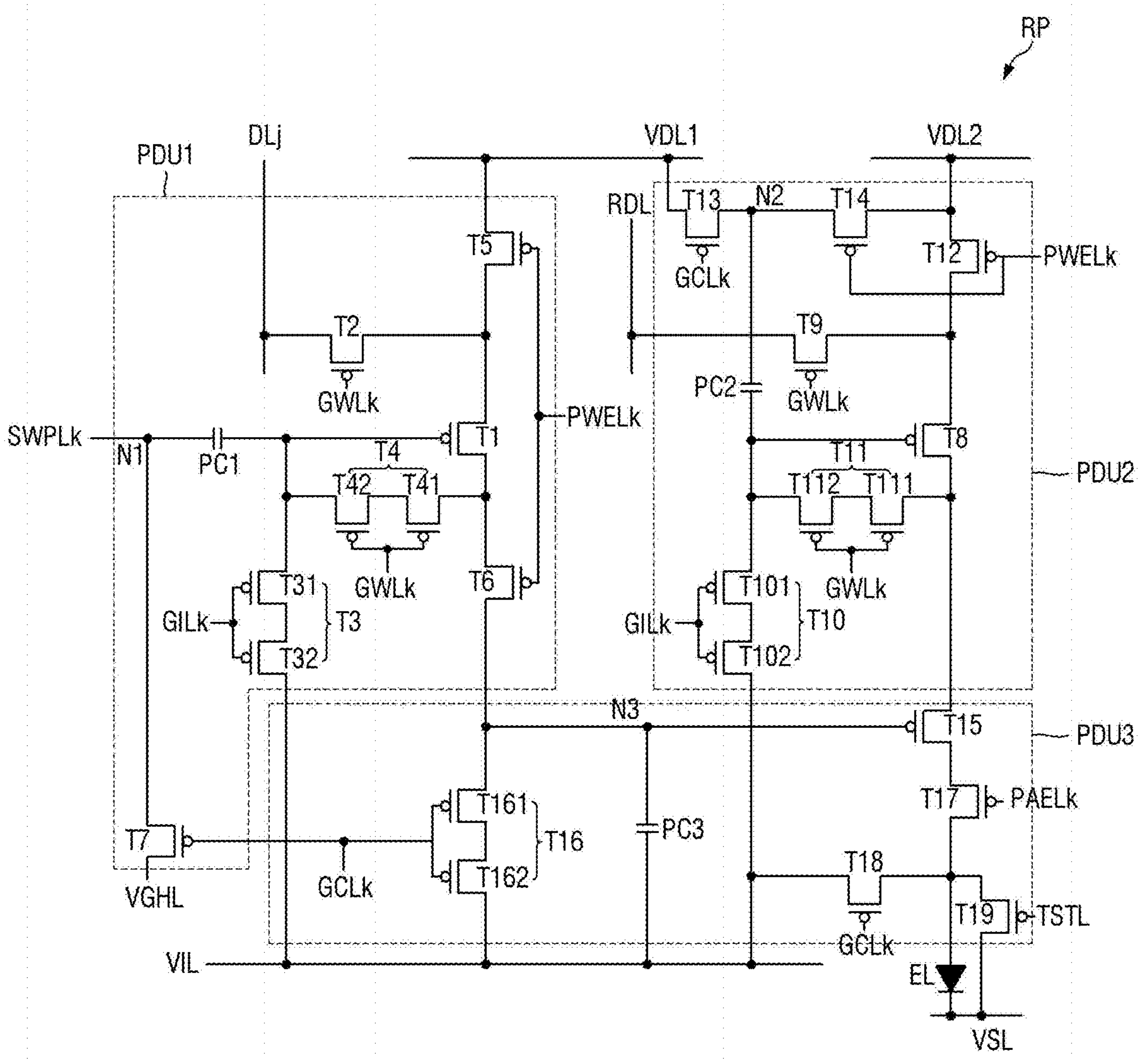
FIG. 2 is a circuit diagram of a first subpixel according to one or more embodiments.

FIG. 2 is a circuit diagram of a first subpixel RP according to one or more embodiments.

Referring to FIG. 2, the first subpixel RP according to one or more embodiments may be connected to a $k^{th}$ scan write line GWLk, a $k^{th}$ scan initialization line GILk, a $k^{th}$ scan control line GCLk, a $k^{th}$ sweep signal line SWPLk, a $k^{th}$ PWM emission line PWELk, and a $k^{th}$ PAM emission line PAELk. In addition, the first subpixel RP may be connected to a $j^{th}$ PWM data line DLj and a first PAM data line RDL. In addition, the first subpixel RP may be connected to a first power line VDL1 to which the first power supply voltage VDD1 is applied, a second power line VDL2 to which the second power supply voltage VDD2 is applied, a third power line VSL to which the third power supply voltage VSS is applied, an initialization voltage line VIL to which the initialization voltage VINT is applied, and a gate-off voltage line VGHL to which the gate-off voltage VGH is applied. For ease of description, the $j^{th}$ PWM data line DLj may be referred to as a first data line, and the first PAM data line RDL may be referred to as a second data line.

The first subpixel RP may include a light emitting element EL, a first pixel driver PDU1, a second pixel driver PDU2, and a third pixel driver PDU3.

The light emitting element EL emits light according to a driving current Ids generated by the second pixel driver PDU2. The light emitting element EL may be located between a seventeenth transistor T17 and the third power line VSL. The light emitting element EL may have a first electrode connected to a second electrode of the seventeenth transistor T17 and a second electrode connected to the third power line VSL. The first electrode of the light emitting element EL may be an anode, and the second electrode may be a cathode. The light emitting element EL may be an inorganic light emitting element including a first electrode, a second electrode, and an inorganic semiconductor located between the first electrode and the second electrode. For example, the light emitting element EL may be, but is not limited to, a micro-light emitting diode made of an inorganic semiconductor.

The first pixel driver PDU1 controls a voltage of a third node N3 of the third pixel driver PDU3 by generating a control current Ic according to a $j^{th}$ data voltage of the $j^{th}$ PWM data line DLj. Because a pulse width of the driving current Ids flowing through the light emitting element EL may be adjusted by the control current Ic of the first pixel driver PDU1, the first pixel driver PDU1 may be a PWM unit that performs pulse width modulation of the driving current Ids flowing through the light emitting element EL.

The first pixel driver PDU1 may include first through seventh transistors T1 through T7 and a first capacitor PC1.

The first transistor T1 controls the control current Ic flowing between a second electrode and a first electrode according to a data voltage applied to a gate electrode.

The second transistor T2 is turned on by a $k^{th}$ scan write signal of the $k^{th}$ scan write line GWLk to supply the data voltage of the $j^{th}$ PWM data line DLj to the first electrode of the first transistor T1. The second transistor T2 may have a gate electrode connected to the $k^{th}$ scan write line GWLk, a first electrode connected to the $j^{th}$ PWM data line DLj, and a second electrode connected to the first electrode of the first transistor T1.

The third transistor T3 is turned on by a $k^{th}$ scan initialization signal of the $k^{th}$ scan initialization line GILk to connect the initialization voltage line VIL to the gate electrode of the first transistor T1. Therefore, during a period in which the third transistor T3 is turned on, the gate electrode of the first transistor T1 may be discharged to the initialization voltage VINT of the initialization voltage line VIL. Here, the gate-on voltage VGL of the $k^{th}$ scan initialization signal may be different from the initialization voltage VINT of the initialization voltage line VIL. For example, because a difference voltage between the gate-on voltage VGL and the initialization voltage VINT is greater than a threshold voltage of the third transistor T3, the third transistor T3 may be stably turned on even after the initialization voltage VINT is applied to the gate electrode of the first transistor T1. Therefore, when the third transistor T3 is turned on, the initialization voltage VINT may be stably applied to the gate electrode of the first transistor T1 regardless of the threshold voltage of the third transistor T3.

The third transistor T3 may include a plurality of transistors connected in series. For example, the third transistor T3 may include a first sub-transistor T31 and a second sub-transistor T32. Therefore, it is possible to reduce or prevent leakage of a voltage of the gate electrode of the first transistor T1 through the third transistor T3. The first sub-transistor T31 may have a gate electrode connected to the $k^{th}$ scan initialization line GILk, a first electrode connected to the gate electrode of the first transistor T1, and a second electrode connected to a first electrode of the second sub-transistor T32. The second sub-transistor T32 may have a gate electrode connected to the $k^{th}$ scan initialization line GILk, the first electrode connected to the second electrode of the first sub-transistor T31, and a second electrode connected to the initialization voltage line VIL.

The fourth transistor T4 is turned on by the $k^{th}$ scan write signal of the $k^{th}$ scan write line GWLk to connect the gate electrode and the second electrode of the first transistor T1. Therefore, during a period in which the fourth transistor T4 is turned on, the first transistor T1 may operate as a diode.

The fourth transistor T4 may include a plurality of transistors connected in series. For example, the fourth transistor T4 may include a third sub-transistor T41 and a fourth sub-transistor T42. Therefore, it is possible to reduce or prevent leakage of the voltage of the gate electrode of the first transistor T1 through the fourth transistor T4. The third sub-transistor T41 may have a gate electrode connected to the $k^{th}$ scan write line GWLk, a first electrode connected to the second electrode of the first transistor T1, and a second electrode connected to a first electrode of the fourth sub-transistor T42. The fourth sub-transistor T42 may have a gate electrode connected to the $k^{th}$ scan write line GWLk, the first electrode connected to the second electrode of the third sub-transistor T41, and a second electrode connected to the gate electrode of the first transistor T1.

The fifth transistor T5 is turned on by a $k^{th}$ PWM emission signal of the $k^{th}$ PWM emission line PWELk to connect the first electrode of the first transistor T1 to the first power line VDL1. The fifth transistor T5 may have a gate electrode connected to the $k^{th}$ PWM emission line PWELk, a first electrode connected to the first power line VDL1, and a second electrode connected to the first electrode of the first transistor T1.

The sixth transistor T6 is turned on by the $k^{th}$ PWM emission signal of the $k^{th}$ PWM emission line PWELk to connect the second electrode of the first transistor T1 to the third node N3 of the third pixel driver PDU3. The sixth transistor T6 may have a gate electrode connected to the $k^{th}$ PWM emission line PWELk, a first electrode connected to the second electrode of the first transistor T1, and a second electrode connected to the third node N3 of the third pixel driver PDU3.

The seventh transistor T7 is turned on by a $k^{th}$ scan control signal of the $k^{th}$ scan control line GCLk to supply the gate-off voltage VGH of the gate-off voltage line VGHL to a first node N1 connected to the $k^{th}$ sweep signal line SWPLk. Therefore, it is possible to reduce or prevent a voltage change of the gate electrode of the first transistor T1 being reflected in a $k^{th}$ sweep signal of the $k^{th}$ sweep signal line SWPLk by the first capacitor PC1 during a period in which the initialization voltage VINT is applied to the gate electrode of the first transistor T1, and during a period in which the data voltage of the $j^{th}$ PWM data line DLj and a threshold voltage Vth1 of the first transistor T1 are programmed. The seventh transistor T7 may have a gate electrode connected to the $k^{th}$ scan control line GCLk, a first electrode connected to the gate-off voltage line VGHL, and a second electrode connected to the first node N1.

The first capacitor PC1 may be located between the gate electrode of the first transistor T1 and the first node N1. The first capacitor PC1 may have one electrode connected to the gate electrode of the first transistor T1 and the other electrode connected to the first node N1.

The first node N1 may be a contact point of the $k^{th}$ sweep signal line SWPLk, the second electrode of the seventh transistor T7, and the other electrode of the first capacitor PC1.

The second pixel driver PDU2 generates the driving current Ids applied to the light emitting element EL according to the first PAM data voltage of the first PAM data line RDL. The second pixel driver PDU2 may be a PAM unit that performs pulse amplitude modulation. The second pixel driver PDU2 may be a constant current generator that generates a constant driving current Ids according to the first PAM data voltage.

In addition, the second pixel driver PDU2 of each first subpixel RP may receive the same first PAM data voltage regardless of the luminance of the first subpixel RP, and may generate the same driving current Ids. Likewise, the second pixel driver PDU2 of each second subpixel GP may receive the same second PAM data voltage regardless of the luminance of the second subpixel GP, and may generate the same driving current Ids. The second pixel driver PDU2 of each third subpixel BP may receive the same third PAM data voltage regardless of the luminance of the third subpixel BP, and may generate the same driving current Ids.

The second pixel driver PDU2 may include eighth through fourteenth transistors T8 through T14 and a second capacitor PC2.

The eighth transistor T8 controls the driving current Ids flowing to the light emitting element EL according to a voltage applied to a gate electrode.

The ninth transistor T9 is turned on by the $k^{th}$ scan write signal of the $k^{th}$ scan write line GWLk to supply the first PAM data voltage of the first PAM data line RDL to a first electrode of the eighth transistor T8. The ninth transistor T9 may have a gate electrode connected to the $k^{th}$ scan write line GWLk, a first electrode connected to the first PAM data line RDL, and a second electrode connected to the first electrode of the eighth transistor T8.

The tenth transistor T10 is turned on by the $k^{th}$ scan initialization signal of the $k^{th}$ scan initialization line GILk to connect the initialization voltage line VIL to the gate electrode of the eighth transistor T8. Therefore, during a period in which the tenth transistor T10 is turned on, the gate electrode of the eighth transistor T8 may be discharged to the initialization voltage VINT of the initialization voltage line VIL. Here, the gate-on voltage VGL of the $k^{th}$ scan initialization signal may be different from the initialization voltage VINT of the initialization voltage line VIL. For example, because the difference voltage between the gate-on voltage VGL and the initialization voltage VINT is greater than a threshold voltage of the tenth transistor T10, the tenth transistor T10 may be stably turned on even after the initialization voltage VINT is applied to the gate electrode of the eighth transistor T8. Therefore, when the tenth transistor T10 is turned on, the initialization voltage VINT may be stably applied to the gate electrode of the eighth transistor T8 regardless of the threshold voltage of the tenth transistor T10.

The tenth transistor T10 may include a plurality of transistors connected in series. For example, the tenth transistor T10 may include a fifth sub-transistor T101 and a sixth sub-transistor T102. Therefore, it is possible to reduce or prevent leakage of a voltage of the gate electrode of the eighth transistor T8 through the tenth transistor T10. The fifth sub-transistor T101 may have a gate electrode connected to the $k^{th}$ scan initialization line GILk, a first electrode connected to the gate electrode of the eighth transistor T8, and a second electrode connected to a first electrode of the sixth sub-transistor T102. The sixth sub-transistor T102 may have a gate electrode connected to the $k^{th}$ scan initialization line GILk, the first electrode connected to the second electrode of the fifth sub-transistor T101, and a second electrode connected to the initialization voltage line VIL.

The eleventh transistor T11 is turned on by the $k^{th}$ scan write signal of the $k^{th}$ scan write line GWLk to connect the gate electrode and a second electrode of the eighth transistor T8. Therefore, during a period in which the eleventh transistor T11 is turned on, the eighth transistor T8 may operate as a diode.

The eleventh transistor T11 may include a plurality of transistors connected in series. For example, the eleventh transistor T11 may include a seventh sub-transistor T111 and an eighth sub-transistor T112. Therefore, it is possible to prevent or reduce leakage of the voltage of the gate electrode of the eighth transistor T8 through the eleventh transistor T11. The seventh sub-transistor T111 may have a gate electrode connected to the $k^{th}$ scan write line GWLk, a first electrode connected to the second electrode of the eighth transistor T8, and a second electrode connected to a first electrode of the eighth sub-transistor T112. The eighth sub-transistor T112 may have a gate electrode connected to the $k^{th}$ scan write line GWLk, the first electrode connected to the second electrode of the seventh sub-transistor T111, and a second electrode connected to the gate electrode of the eighth transistor T8.

The twelfth transistor T12 is turned on by the $k^{th}$ PWM emission signal of the $k^{th}$ PWM emission line PWELk to connect the first electrode of the eighth transistor T8 to the second power line VDL2. The twelfth transistor T12 may have a gate electrode connected to the $k^{th}$ PWM emission line PWELk, a first electrode connected to the first power line VDL1, and a second electrode connected to the first electrode of the eighth transistor T8.

The thirteenth transistor T13 is turned on by the $k^{th}$ scan control signal of the $k^{th}$ scan control line GCLk to connect the first power line VDL1 to a second node N2. The thirteenth transistor T13 may have a gate electrode connected to the $k^{th}$ scan control line GCLk, a first electrode connected to the first power line VDL1, and a second electrode connected to the second node N2.

The fourteenth transistor T14 is turned on by the $k^{th}$ PWM emission signal of the $k^{th}$ PWM emission line PWELk to connect the second power line VDL2 to the second node N2. Therefore, when the fourteenth transistor T14 is turned on, the second power supply voltage VDD2 of the second power line VDL2 may be supplied to the second node N2. The fourteenth transistor T14 may have a gate electrode connected to the $k^{th}$ PWM emission line PWELk, a first electrode connected to the second power line VDL2, and a second electrode connected to the second node N2.

The second capacitor PC2 may be located between the gate electrode of the eighth transistor T8 and the second node N2. The second capacitor PC2 may have one electrode connected to the gate electrode of the eighth transistor T8 and the other electrode connected to the second node N2.

The second node N2 may be a contact point of the second electrode of the thirteenth transistor T13, the second electrode of the fourteenth transistor T14, and the other electrode of the second capacitor PC2.

The third pixel driver PDU3 adjusts a period during which the driving current Ids is applied to the light emitting element EL according to a voltage of the third node N3.

The third pixel driver PDU3 may include fifteenth through nineteenth transistors T15 through T19 and a third capacitor PC3.

The fifteenth transistor T15 is turned on or turned off according to the voltage of the third node N3. When the fifteenth transistor T15 is turned on, the driving current Ids of the eighth transistor T8 may be supplied to the light emitting element EL. When the fifteenth transistor T15 is turned off, the driving current Ids of the eighth transistor T8 may not be supplied to the light emitting element EL. Therefore, a turn-on period of the fifteenth transistor T15 may be substantially the same as an emission period of the light emitting element EL. The fifteenth transistor T15 may have a gate electrode connected to the third node N3, a first electrode connected to the second electrode of the eighth transistor T8, and a second electrode connected to a first electrode of the seventeenth transistor T17.

The sixteenth transistor T16 is turned on by the $k^{th}$ scan control signal of the $k^{th}$ scan control line GCLk to connect the initialization voltage line VIL to the third node N3. Therefore, during a period in which the sixteenth transistor T16 is turned on, the third node N3 may be discharged to the initialization voltage VINT of the initialization voltage line VIL.

The sixteenth transistor T16 may include a plurality of transistors connected in series. For example, the sixteenth transistor T16 may include a ninth sub-transistor T161 and a tenth sub-transistor T162. Therefore, it is possible to reduce or prevent leakage of the voltage of the third node N3 through the sixteenth transistor T16. The ninth sub-transistor T161 may have a gate electrode connected to the $k^{th}$ scan control line GCLk, a first electrode connected to the third node N3, and a second electrode connected to a first electrode of the tenth sub-transistor T162. The tenth sub-transistor T162 may have a gate electrode connected to the $k^{th}$ scan control line GCLk, the first electrode connected to the second electrode of the ninth sub-transistor T161, and a second electrode connected to the initialization voltage line VIL.

The seventeenth transistor T17 is turned on by a $k^{th}$ PAM emission signal of the $k^{th}$ PAM emission line PAELk to connect the second electrode of the fifteenth transistor T15 to the first electrode of the light emitting element EL. The seventeenth transistor T17 may have a gate electrode connected to the $k^{th}$ PAM emission line PAELk, the first electrode connected to the second electrode of the fifteenth transistor T15, and the second electrode connected to the first electrode of the light emitting element EL.

The eighteenth transistor T18 is turned on by the $k^{th}$ scan control signal of the $k^{th}$ scan control line GCLk to connect the initialization voltage line VIL to the first electrode of the light emitting element EL. Therefore, during a period in which the eighteenth transistor T18 is turned on, the first electrode of the light emitting element EL may be discharged to the initialization voltage VINT of the initialization voltage line VIL. The eighteenth transistor T18 may have a gate electrode connected to the $k^{th}$ scan control line GCLk, a first electrode connected to the first electrode of the light emitting element EL, and a second electrode connected to the initialization voltage line VIL.

The nineteenth transistor T19 is turned on by a test signal of a test signal line TSTL to connect the first electrode of the light emitting element EL to the third power line VSL. The nineteenth transistor T19 may have a gate electrode connected to the test signal line TSTL, a first electrode connected to the first electrode of the light emitting element EL, and a second electrode connected to the third power line VSL.

The third capacitor PC3 may be located between the third node N3 and the initialization voltage line VIL. The third capacitor PC3 may have one electrode connected to the third node N3 and the other electrode connected to the initialization voltage line VIL.

The third node N3 may be a contact point of the second electrode of the sixth transistor T6, the gate electrode of the fifteenth transistor T15, the first electrode of the ninth sub-transistor T161, and the one electrode of the third capacitor PC3.

Any one of the first electrode and the second electrode of each of the first through nineteenth transistors T1 through T19 may be a source electrode, and the other may be a drain electrode. An active layer of each of the first through nineteenth transistors T1 through T19 may be made of any one of polysilicon, amorphous silicon, and an oxide semiconductor. When the active layer of each of the first through nineteenth transistors T1 through T19 is polysilicon, it may be formed by a low-temperature polysilicon (LTPS) process.

In addition, although a case where each of the first through nineteenth transistors T1 through T19 is formed as a P-type metal oxide semiconductor field effect transistor (MOSFET) has been mainly described in FIG. 2, embodiments of the present specification are not limited thereto. For example, each of the first through nineteenth transistors T1 through T19 may also be formed as an N-type MOSFET.

Alternatively, to increase the black expression ability of the light emitting element EL by blocking a leakage current, the first sub-transistor T31 and the second sub-transistor T32 of the third transistor T3, the third sub-transistor T41 and the fourth sub-transistor T42 of the fourth transistor T4, the fifth sub-transistor T101 and the sixth sub-transistor T102 of the tenth transistor T10, and the seventh sub-transistor T111 and the eighth sub-transistor T112 of the eleventh transistor T11 in the first subpixel RP may be formed as N-type MOSFETs. In this case, the gate electrode of the third sub-transistor T41 and the gate electrode of the fourth sub-transistor T42 of the fourth transistor T4, and the gate electrode of the seventh sub-transistor T111 and the gate electrode of the eighth sub-transistor T112 of the eleventh transistor T11, may be connected to the $k^{th}$ scan write line GWLk. The $k^{th}$ scan initialization signal GILk and the $k^{th}$ scan write signal may have pulses generated as the gate-off voltage VGH. In addition, the active layers of the first sub-transistor T31 and the second sub-transistor T32 of the third transistor T3, the third sub-transistor T41 and the fourth sub-transistor T42 of the fourth transistor T4, the fifth sub-transistor T101 and the sixth sub-transistor T102 of the tenth transistor T10, and the seventh sub-transistor T111 and the eighth sub-transistor T112 of the eleventh transistor T11, may be made of an oxide semiconductor, and the active layers of the other transistors may be made of polysilicon.

Alternatively, any one of the first sub-transistor T31 and the second sub-transistor T32 of the third transistor T3 may be formed as an N-type MOSFET, and the other may be formed as a P-type MOSFET. In this case, a transistor formed as an N-type MOSFET among the first sub-transistor T31 and the second sub-transistor T32 of the third transistor T3 may be made of an oxide semiconductor, and a transistor formed as a P-type MOSFET may be made of polysilicon.

Alternatively, any one of the third sub-transistor T41 and the fourth sub-transistor T42 of the fourth transistor T4 may be formed as an N-type MOSFET, and the other may be formed as a P-type MOSFET. In this case, a transistor formed as an N-type MOSFET among the third sub-transistor T41 and the fourth sub-transistor T42 of the fourth transistor T4 may be made of an oxide semiconductor, and a transistor formed as a P-type MOSFET may be made of polysilicon.

Alternatively, any one of the fifth sub-transistor T101 and the sixth sub-transistor T102 of the tenth transistor T10 may be formed as an N-type MOSFET, and the other may be formed as a P-type MOSFET. In this case, a transistor formed as an N-type MOSFET among the fifth sub-transistor T101 and the sixth sub-transistor T102 of the tenth transistor T10 may be made of an oxide semiconductor, and a transistor formed as a P-type MOSFET may be made of polysilicon.

Alternatively, any one of the seventh sub-transistor T111 and the eighth sub-transistor T112 of the eleventh transistor T11 may be formed as an N-type MOSFET, and the other may be formed as a P-type MOSFET. In this case, a transistor formed as an N-type MOSFET among the seventh sub-transistor T111 and the eighth sub-transistor T112 of the eleventh transistor T11 may be made of an oxide semiconductor, and a transistor formed as a P-type MOSFET may be made of polysilicon.

A second subpixel GP and a third subpixel BP may be substantially the same as the first subpixel RP described above with reference to FIG. 2. Therefore, a description of the second subpixel GP and the third subpixel BP will be omitted.

Figure 3:
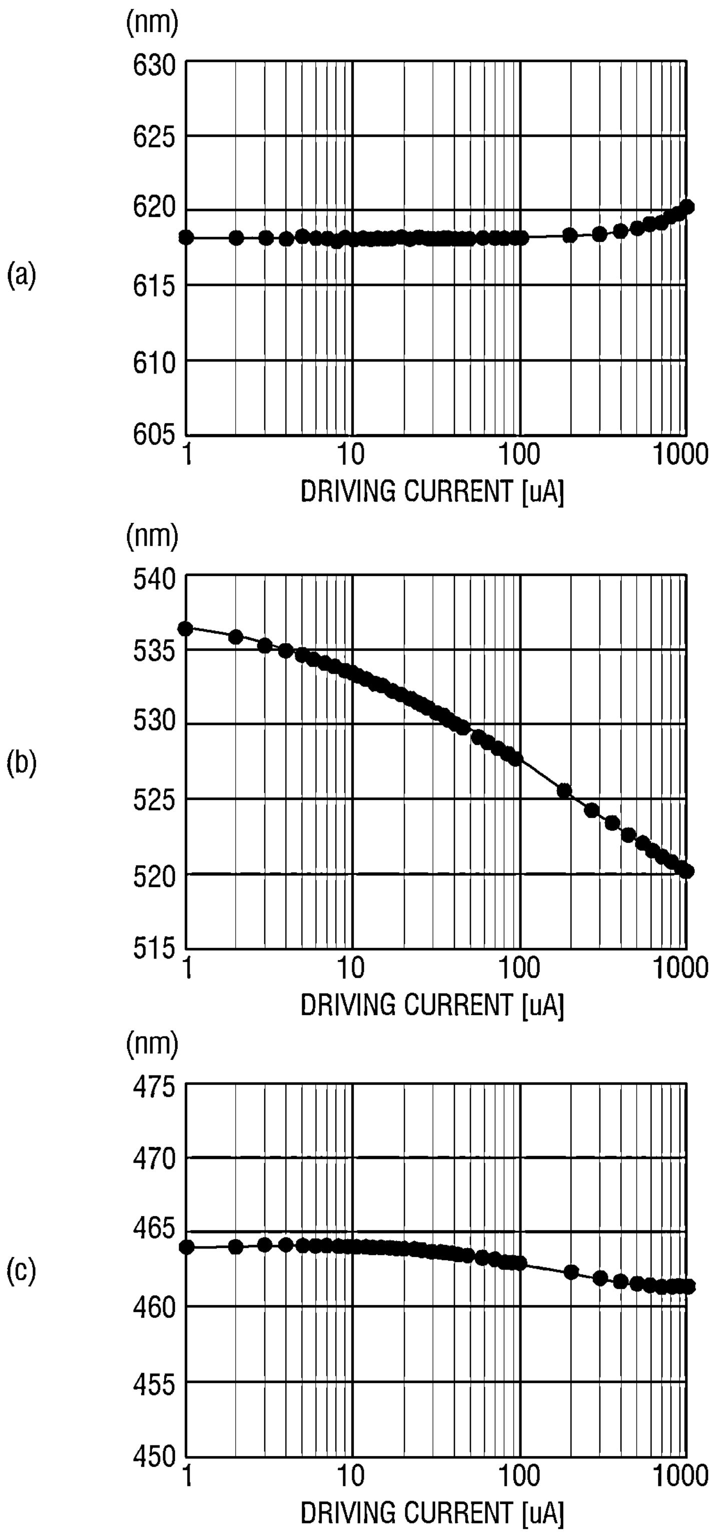
FIG. 3 is a graph illustrating the wavelength of light emitted from a light emitting element of a first subpixel, the wavelength of light emitted from a light emitting element of a second subpixel, and the wavelength of light emitted from a light emitting element of a third subpixel according to a driving current according to one or more embodiments.

FIG. 3 is a graph illustrating the wavelength of light emitted from the light emitting element EL of a first subpixel RP, the wavelength of light emitted from the light emitting element EL of a second subpixel GP, and the wavelength of light emitted from the light emitting element EL of a third subpixel BP according to the driving current Ids according to one or more embodiments.

FIG. 3A illustrates the wavelength of light emitted from the light emitting element EL of the first subpixel RP according to the driving current Ids applied to the light emitting element EL of the first subpixel RP when the light emitting element EL of the first subpixel RP includes an inorganic material (e.g., GaN). FIG. 3B illustrates the wavelength of light emitted from the light emitting element EL of the second subpixel GP according to the driving current Ids applied to the light emitting element EL of the second subpixel GP when the light emitting element EL of the second subpixel GP includes an inorganic material (e.g., GaN). FIG. 3C illustrates the wavelength of light emitted from the light emitting element EL of the third subpixel BP according to the driving current Ids applied to the light emitting element EL of the third subpixel BP when the light emitting element EL of the third subpixel BP includes an inorganic material (e.g., GaN). In each of the graphs of FIG. 3A through 3C, the X-axis represents the driving current Ids, and the Y-axis represents the wavelength of light emitted from the light emitting element EL.

Referring to FIG. 3, when the driving current Ids applied to the light emitting element EL of the first subpixel RP is about 1 μA to 300 μA, the wavelength of light emitted from the light emitting element EL of the first subpixel RP is constant at about 618 nm. As the driving current Ids applied to the light emitting element EL of the first subpixel RP increases from about 300 μA to about 1000 μA, the wavelength of light emitted from the light emitting element EL of the first subpixel RP increases from about 618 nm to about 620 nm.

As the driving current Ids applied to the light emitting element EL of the second subpixel GP increases from about 1 μA to about 1000 μA, the wavelength of light emitted from the light emitting element EL of the second subpixel GP decreases from about 536 nm to about 520 nm.

As the driving current Ids applied to the light emitting element EL of the third subpixel BP increases from about 1 μA to about 1000 μA, the wavelength of light emitted from the light emitting element EL of the third subpixel BP decreases from about 464 nm to about 461 nm.

In summary, the wavelength of light emitted from the light emitting element EL of the first subpixel RP and the wavelength of light emitted from the light emitting element EL of the third subpixel BP hardly change even when the driving current Ids changes. In contrast, the wavelength of light emitted from the light emitting element EL of the second subpixel GP is inversely proportional to the driving current Ids. Therefore, when the driving current Ids applied to the light emitting element EL of the second subpixel GP is adjusted, the wavelength of light emitted from the light emitting element EL of the second subpixel GP may be changed, and color coordinates of an image displayed by the display panel 100 may be changed.

Figure 4:
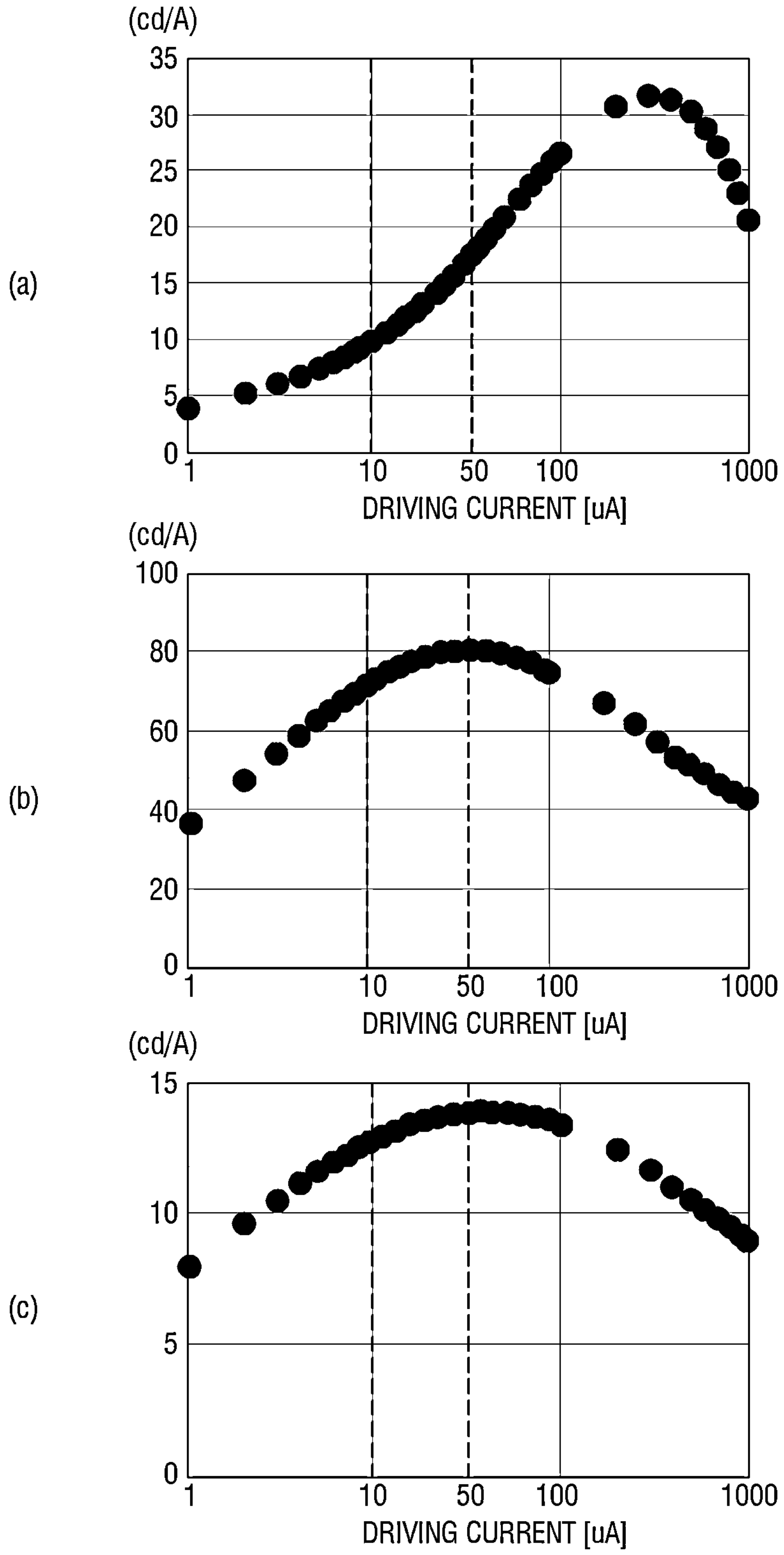
FIG. 4 is a graph illustrating the luminous efficiency of the light emitting element of a first subpixel, the luminous efficiency of the light emitting element of a second subpixel, and the luminous efficiency of the light emitting element of a third subpixel according to the driving current according to one or more embodiments.

FIG. 4 is a graph illustrating the luminous efficiency of the light emitting element EL of a first subpixel RP, the luminous efficiency of the light emitting element EL of a second subpixel GP, and the luminous efficiency of the light emitting element EL of a third subpixel BP according to the driving current Ids according to one or more embodiments.

FIG. 4A illustrates the luminous efficiency of the light emitting element EL of the first subpixel RP according to the driving current Ids applied to the light emitting element EL of the first subpixel RP when the light emitting element EL of the first subpixel RP is made of an inorganic material. FIG. 4B illustrates the luminous efficiency of the light emitting element EL of the second subpixel GP according to the driving current Ids applied to the light emitting element EL of the second subpixel GP when the light emitting element EL of the second subpixel GP is made of an inorganic material. FIG. 4C illustrates the luminous efficiency of the light emitting element EL of the third subpixel BP according to the driving current Ids applied to the light emitting element EL of the third subpixel BP when the light emitting element EL of the third subpixel BP is made of an inorganic material.

Referring to FIG. 4, when the driving current Ids applied to the light emitting element EL of the first subpixel RP is about 10 μA, the luminous efficiency of the light emitting element EL of the first subpixel RP is about 8.5 cd/A. When the driving current Ids applied to the light emitting element EL of the first subpixel RP is about 50 μA, the luminous efficiency of the light emitting element EL of the first subpixel RP is about 18 cd/A. That is, when the driving current Ids applied to the light emitting element EL of the first subpixel RP is about 50 μA, the luminous efficiency increases by about 2.1 times compared with when the driving current Ids is about 10 PA.

When the driving current Ids applied to the light emitting element EL of the second subpixel GP is about 10 μA, the luminous efficiency of the light emitting element EL of the second subpixel GP is about 72 cd/A. When the driving current Ids applied to the light emitting element EL of the second subpixel GP is about 50 PA, the luminous efficiency of the light emitting element EL of the second subpixel GP is about 80 cd/A. That is, when the driving current Ids applied to the light emitting element EL of the second subpixel GP is about 50 μA, the luminous efficiency increases by about 1.1 times compared with when the driving current Ids is about 10 PA.

When the driving current Ids applied to the light emitting element EL of the third subpixel BP is about 10 μA, the luminous efficiency of the light emitting element EL of the third subpixel BP is about 13.2 cd/A. When the driving current Ids applied to the light emitting element EL of the third subpixel BP is about 50 PA, the luminous efficiency of the light emitting element EL of the third subpixel BP is about 14 cd/A. That is, when the driving current Ids applied to the light emitting element EL of the third subpixel BP is about 50 μA, the luminous efficiency increases by about 1.06 times compared with when the driving current Ids is about 10 PA.

In summary, the luminous efficiency of the light emitting element EL of the first subpixel RP, the luminous efficiency of the light emitting element EL of the second subpixel GP, and the luminous efficiency of the light emitting element EL of the third subpixel BP may vary according to the driving current Ids.

As illustrated in FIGS. 3 and 4, when the driving current Ids applied to the light emitting element EL of the second subpixel GP is adjusted, color coordinates of an image displayed by the display panel 100 may be changed. In addition, the luminous efficiency of the light emitting element EL of the first subpixel RP, the luminous efficiency of the light emitting element EL of the second subpixel GP, and the luminous efficiency of the light emitting element EL of the third subpixel BP may vary according to the driving current Ids. Therefore, it may be suitable to maintain a constant driving current Ids in each of the first subpixel RP, the second subpixel GP, and the third subpixel BP, and may adjust the luminance of each of the first subpixel RP, the second subpixel GP, and the third subpixel BP by adjusting a period during which the driving current Ids is applied, so that color coordinates of an image displayed by the display panel 100 may be maintained constant, and so that the light emitting element EL of the first subpixel RP, the light emitting element EL of the second subpixel GP, and the light emitting element EL of the third subpixel BP may have optimal luminous efficiency.

That is, as illustrated in FIG. 2, the second pixel driver PDU2 of the first subpixel RP generates the driving current Ids according to the first PAM data voltage of the first PAM data line RDL so that the light emitting element EL of the first subpixel RP is driven with improved or optimized luminous efficiency. The first pixel driver PDU1 of the first subpixel RP controls the voltage of the third node N3 of the third pixel driver PDU3 by generating the control current Ic according to the data voltage of the PWM data line, and the third pixel driver PDU3 adjusts the period during which the driving current Ids is applied to the light emitting element EL according to the voltage of the third node N3. Therefore, the first subpixel RP may generate a constant driving current Ids to drive the light emitting element EL with improved or optimized luminous efficiency, and may adjust the luminance of light emitted from the light emitting element EL by adjusting a duty ratio of the light emitting element EL, that is, the period during which the driving current Ids is applied to the light emitting element EL.

In addition, the second pixel driver PDU2 of the second subpixel GP generates the driving current Ids according to the second PAM data voltage of a second PAM data line GDL so that the light emitting element EL of the second subpixel GP is driven with improved or optimized luminous efficiency. The first pixel driver PDU1 of the second subpixel GP controls the voltage of the third node N3 of the third pixel driver PDU3 by generating the control current Ic according to the data voltage of the PWM data line, and the third pixel driver PDU3 adjusts the period during which the driving current Ids is applied to the light emitting element EL according to the voltage of the third node N3. Therefore, the second subpixel GP may generate a constant driving current Ids to drive the light emitting element EL with improved or optimized luminous efficiency, and may adjust the luminance of light emitted from the light emitting element EL by adjusting the duty ratio of the light emitting element EL, that is, the period during which the driving current Ids is applied to the light emitting element EL.

In addition, the second pixel driver PDU2 of the third subpixel BP generates the driving current Ids according to the third PAM data voltage of a third PAM data line BDL so that the light emitting element EL of the third subpixel BP is driven with improved or optimized luminous efficiency. The first pixel driver PDU1 of the third subpixel BP controls the voltage of the third node N3 of the third pixel driver PDU3 by generating the control current Ic according to the data voltage of the PWM data line, and the third pixel driver PDU3 adjusts the period during which the driving current Ids is applied to the light emitting element EL according to the voltage of the third node N3. Therefore, the third subpixel BP may generate a constant driving current Ids to drive the light emitting element EL with improved or optimized luminous efficiency, and may adjust the luminance of light emitted from the light emitting element EL by adjusting the duty ratio of the light emitting element EL, that is, the period during which the driving current Ids is applied to the light emitting element EL.

Therefore, it is possible to reduce or prevent deterioration of image quality due to a change in the wavelength of emitted light according to the driving current Ids applied to the light emitting element EL. In addition, each of the light emitting element EL of the first subpixel RP, the light emitting element EL of the second subpixel GP, and the light emitting element EL of the third subpixel BP may emit light with improved or optimized luminous efficiency.

Figure 5:
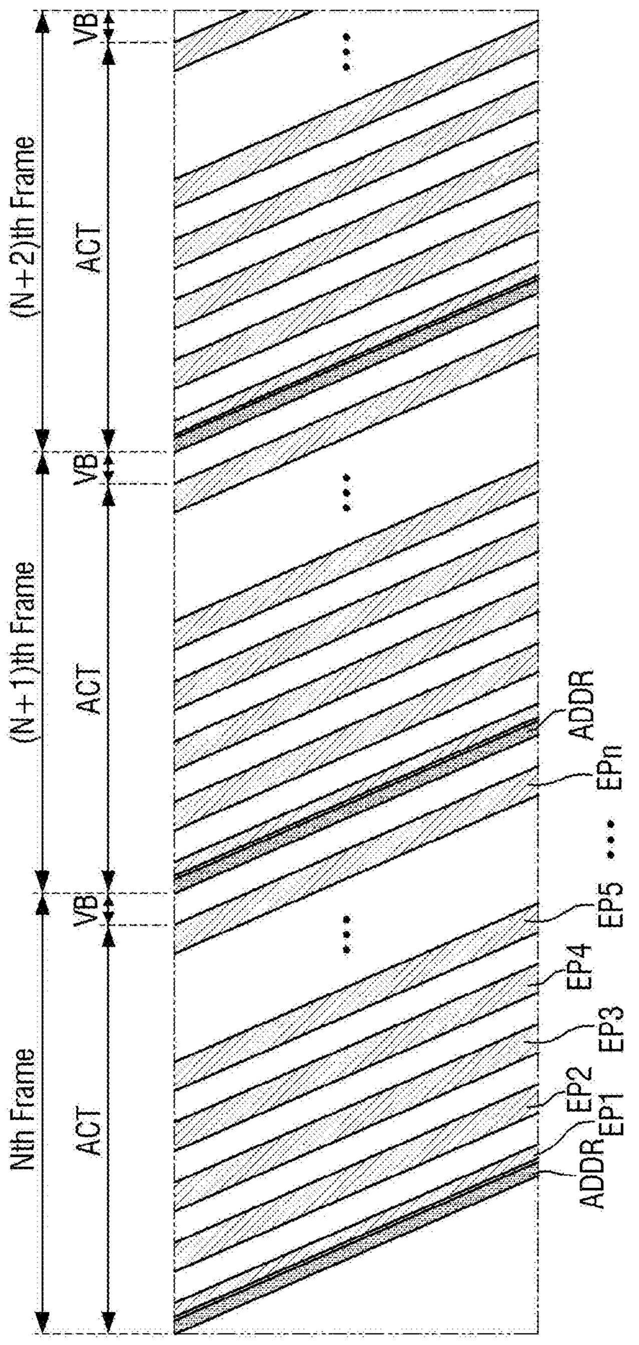
FIG. 5 is an example diagram illustrating the operation of the display device during $N^{th}$ through $(N+2)^{th}$ frame periods.

FIG. 5 is an example diagram illustrating the operation of the display device during $N^{th}$ through $(N+2)^{th}$ frame periods.

Referring to FIG. 5, each of the $N^{th}$ through $(N+2)^{th}$ frame periods may include an active period ACT and a blank period VB. The active period ACT may include a data addressing period ADDR in which a data voltage and the first/second/third PAM data voltage are supplied to each of the first through third subpixels RP, GP, and BP, and a plurality of emission periods EP1 through EPn in which the light emitting element EL of each of the subpixels RP, GP, and BP emits light. The blank period VB may be a period in which the subpixels RP, GP, and BP of the display panel 100 are idle.

The address period ADDR and a first emission period EP1 may be shorter than each of second through $n^{th}$ emission periods EP2 through EPn. For example, the address period ADDR and the first emission period EP1 may be about five horizontal periods, and each of the second through $n^{th}$ emission periods EP2 through EPn may be about twelve horizontal periods, but embodiments of the present specification are not limited thereto. In addition, the active period ACT may include twenty-five emission periods, but the number of the emission periods EP1 through EPn of the active period ACT is not limited thereto.

The subpixels RP, GP, and BP of the display panel 100 may sequentially receive data voltages and the first/second/third PAM data voltages on a row-line-by-row-line basis during the address period ADDR. For example, the data voltages and the first/second/third PAM data voltages may be applied sequentially from the subpixels RP, GP, and BP located in a first row line to the subpixels RP, GP, and BP located in an $n^{th}$ row line, which corresponds to a last row line.

The subpixels RP, GP, and BP of the display panel 100 may sequentially emit light on a row-line-by-row-line basis in each of the emission periods EP1 through EPn. For example, the subpixels RP, GP, and BP may emit light sequentially from the subpixels RP, GP, and BP located in the first row line to the subpixels RP, GP, and BP located in the last row line.

The address period ADDR may overlap at least any one of the emission periods EP1 through EPn. For example, as illustrated in FIG. 5, the address period ADDR may overlap the first through third emission periods EP1 through EP3. In this case, when the subpixels RP, GP, and BP located in a $p^{th}$ row line (where p is a positive integer) receive the data voltages and the first/second/third PAM data voltages, the subpixels RP, GP, and BP located in a $q^{th}$ row line (where q is a positive integer that is less than p) may emit light.

In addition, each of the emission periods EP1 through EPn may overlap neighboring emission periods. For example, the second emission period EP2 may overlap the first emission period EP1 and the third emission period EP3. In this case, while the subpixels RP, GP, and BP located in the $p^{th}$ row line emit light in the second emission period EP2, the subpixels RP, GP, and BP located in the $q^{th}$ row line may emit light in the first emission period EP1.

Figure 6:
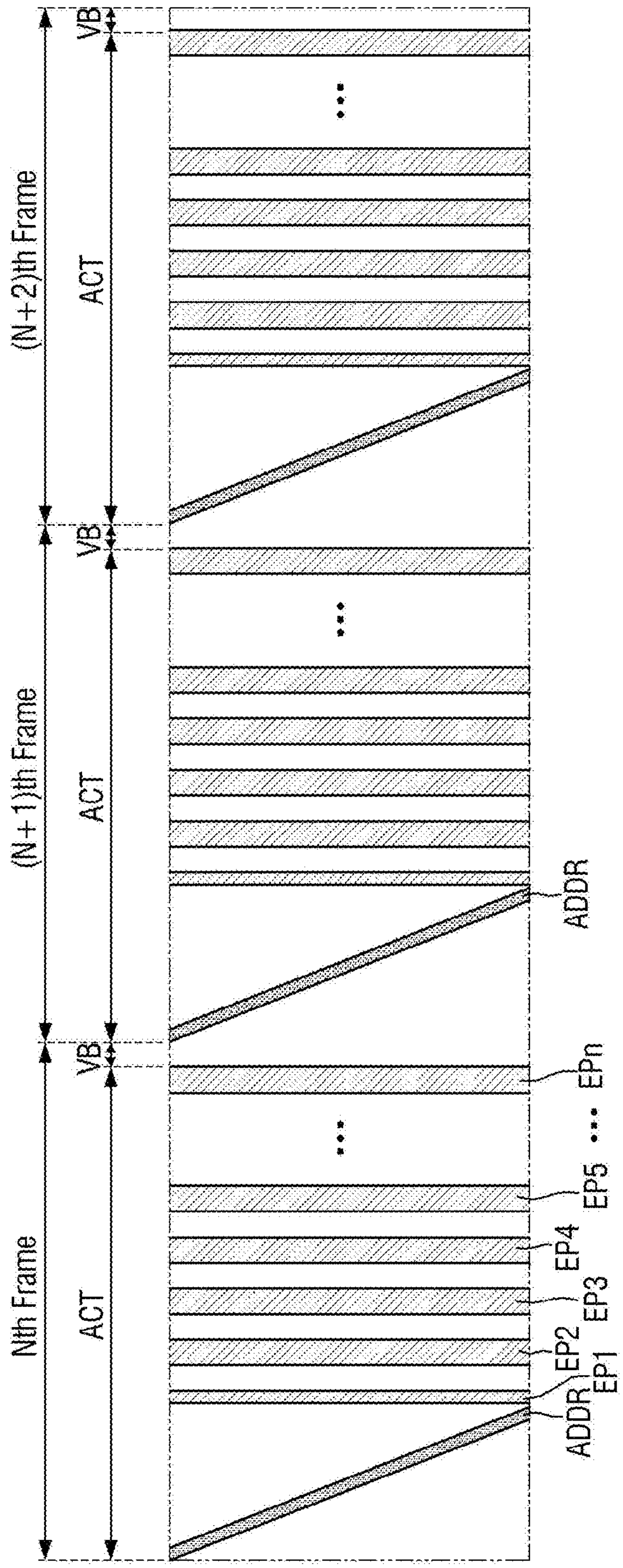
FIG. 6 is another example diagram illustrating the operation of the display device during the $N^{th}$ through $(N+2)^{th}$ frame periods.

FIG. 6 is another example diagram illustrating the operation of the display device during the $N^{th}$ through $(N+2)^{th}$ frame periods.

The embodiments corresponding to FIG. 6 are different from the embodiments corresponding to FIG. 5 in that the subpixels RP, GP, and BP of the display panel 100 concurrently or substantially simultaneously emit light in each of the emission periods EP1 through EPn.

Referring to FIG. 6, the address period ADDR may not overlap the emission periods EP1 through EPn. The first emission period EP1 may occur after the address period ADDR completely ends.

The emission periods EP1 through EPn might not overlap each other. The subpixels RP, GP, and BP located in all row lines may concurrently or substantially simultaneously emit light in each of the emission periods EP1 through EPn.

Figure 7:
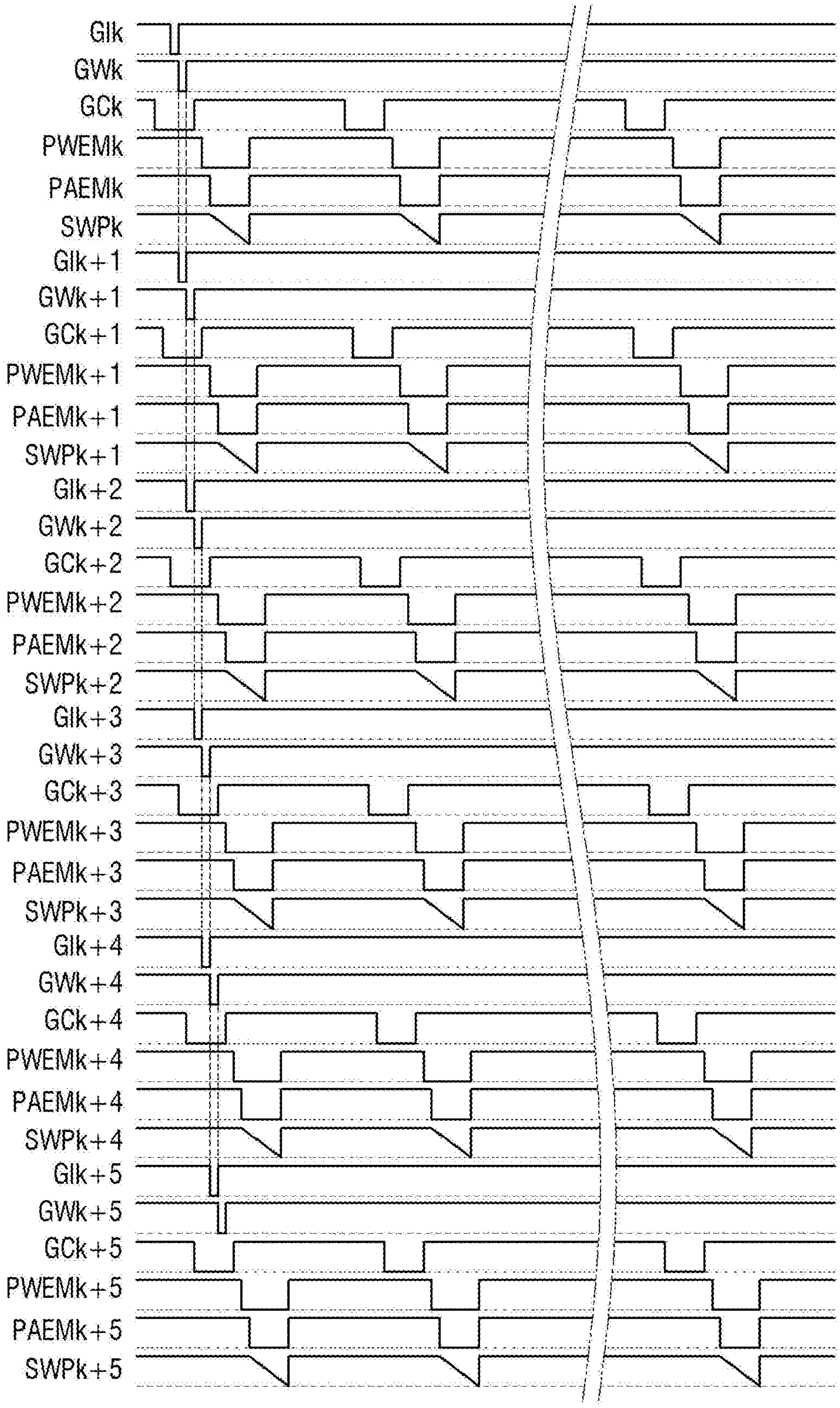
FIG. 7 is a waveform diagram of scan initialization signals, scan write signals, scan control signals, pulse width modulation (PWM) emission signals, pulse amplitude modulation (PAM) emission signals, and sweep signals transmitted to subpixels located in $k^{th}$ through $(k+5)^{th}$ row lines in the $N^{th}$ frame period according to one or more embodiments.

FIG. 7 is a waveform diagram of scan initialization signals Glk through Glk+5, scan write signals GWk through GWk+5, scan control signals GCk through GCk+5, PWM emission signals PWEMk through PWEMk+5, PAM emission signals PAEMk through PAEMk+5, and sweep signals SWPk through SWPk+5 transmitted to subpixels RP, GP, and BP located in $k^{th}$ through $(k+5)^{th}$ row lines in the $N^{th}$ frame period according to one or more embodiments.

Referring to FIG. 7, the subpixels RP, GP, and BP located in the $k^{th}$ row line refer to subpixels RP, GP, and BP connected to the $k^{th}$ scan initialization line GILk, the $k^{th}$ scan write line GWLk, the $k^{th}$ scan control line GCLk, the $k^{th}$ PWM emission line PWELk, the $k^{th}$ PAM emission line PAELk, and the $k^{th}$ sweep signal line SWPLk. A $k^{th}$ scan initialization signal Glk refers to a signal transmitted to the $k^{th}$ scan initialization line GILk, and a $k^{th}$ scan write signal GWk refers to a signal transmitted to the $k^{th}$ scan write line GWLk. A $k^{th}$ scan control signal GCk refers to a signal transmitted to the $k^{th}$ scan control line GCLk, and a $k^{th}$ PWM emission signal PWEMk refers to a signal transmitted to the $k^{th}$ PWM emission line PWELk. A $k^{th}$ PAM emission signal PAEMk refers to a signal transmitted to the $k^{th}$ PAM emission line PAELk, and a $k^{th}$ sweep signal SWPk refers to a signal transmitted to the $k^{th}$ sweep signal line SWPLk.

The scan initialization signals GIk through GIk+5, the scan write signals GWk through GWk+5, the scan control signals GCk through GCk+5, the PWM emission signals PWEMk through PWEMk+5, the PAM emission signals PAEMk through PAEMk+5, and the sweep signals SWPk through SWPk+5 may be sequentially shifted by one horizontal period. The $k^{th}$ scan write signal GWk may be a signal obtained by shifting the $k^{th}$ scan initialization signal GIk by one horizontal period, and a $(k+1)^{th}$ scan write signal GWk+1 may be a signal obtained by shifting a $(k+1)^{th}$ scan initialization signal GIk+1 by one horizontal period. In this case, because the $(k+1)^{th}$ scan initialization signal GIk+1 is a signal obtained by shifting the $k^{th}$ scan initialization signal GIk by one horizontal period, the $k^{th}$ scan write signal GWk and the $(k+1)^{th}$ scan initialization signal GIk+1 may be substantially the same signal.

Figure 8:
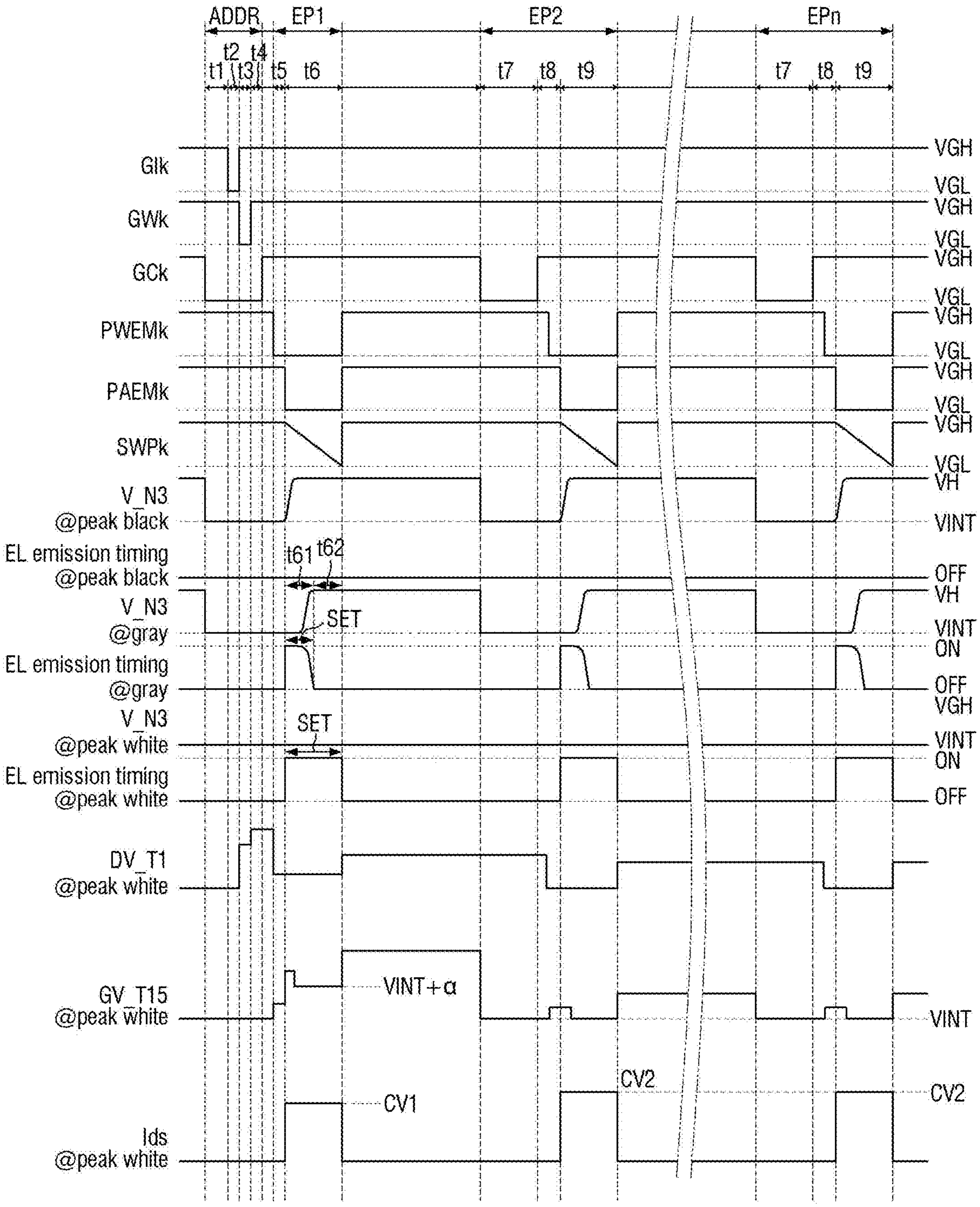
FIG. 8 is a waveform diagram illustrating periods in which a $k^{th}$ scan initialization signal, a $k^{th}$ scan write signal, a $k^{th}$ scan control signal, a $k^{th}$ PWM emission signal, a $k^{th}$ PAM emission signal and a $k^{th}$ sweep signal transmitted to each of the subpixels located in the $k^{th}$ row line, the voltage of a third node, and the driving current applied to the light emitting element are applied in the $N^{th}$ frame period according to one or more embodiments.

FIG. 8 is a waveform diagram illustrating periods in which the $k^{th}$ scan initialization signal GIk, the $k^{th}$ scan write signal GWk, the $k^{th}$ scan control signal GCk, the $k^{th}$ PWM emission signal PWEMk, the $k^{th}$ PAM emission signal PAEMk, and the $k^{th}$ sweep signal SWPk transmitted to each of the subpixels RP, GP, and BP located in the $k^{th}$ row line, the voltage of the third node N3, and the driving current Ids applied to the light emitting element EL are applied in the $N^{th}$ frame period according to one or more embodiments.

Referring to FIG. 8, the $k^{th}$ scan initialization signal GIk is a signal for controlling the turn-on and turn-off of the third and tenth transistors T3 and T10 of each of the subpixels RP, GP, and BP. The $k^{th}$ scan write signal GWk is a signal for controlling the turn-on and turn-off of the second, fourth, ninth, and eleventh transistors T2, T4, T9, and T11 of each of the subpixels RP, GP, and BP. The $k^{th}$ scan control signal GCk is a signal for controlling the turn-on and turn-off of the seventh, thirteenth, sixteenth, and eighteenth transistors T7, T13, T16, and T18 of each of the subpixels RP, GP, and BP. The $k^{th}$ PWM emission signal PWEMk is a signal for controlling the turn-on and turn-off of the fifth, sixth, twelfth, and fourteenth transistors T5, T6, T12, and T14. The $k^{th}$ PAM emission signal PAEMk is a signal for controlling the turn-on and turn-off of the seventeenth transistor T17. The $k^{th}$ scan initialization signal GIk, the $k^{th}$ scan write signal GWk, the $k^{th}$ scan control signal GCk, the $k^{th}$ PWM emission signal PWEMk, the $k^{th}$ PAM emission signal PAEMk, and the $k^{th}$ sweep signal SWPk may be generated with a cycle of one frame period.

The data address period ADDR includes first through fourth periods t1 through t4. The first period t1 and the fourth period t4 are first initialization periods in which the first electrode of the light emitting element EL and the voltage of the third node N3 are initialized. The second period t2 is a second initialization period in which the gate electrode of the first transistor T1 and the gate electrode of the eighth transistor T8 are initialized. The third period t3 is a period in which a data voltage Vdata of the $j^{th}$ PWM data line DLj and the threshold voltage Vth1 of the first transistor T1 are sampled at the gate electrode of the first transistor T1 and in which a first PAM data voltage RVdata of the first PAM data line RDL and a threshold voltage Vth8 of the eighth transistor T8 are sampled at the gate electrode of the eighth transistor T8.

The first emission period EP1 includes a fifth period t5 and a sixth period t6. The fifth period t5 is a period in which the control current Ic is applied to the third node N3, and the sixth period t6 is a period in which the turn-on period of the fifteenth transistor T15 is controlled according to the control current Ic, and the driving current Ids is supplied to the light emitting element EL.

Each of the second through $n^{th}$ emission periods EP2 through EPn includes seventh through ninth periods t7 through t9. The seventh period t7 is a third initialization period in which the third node N3 is initialized, the eighth period t8 is substantially the same as the fifth period t5, and the ninth period t9 is substantially the same as the sixth period t6.

Neighboring emission periods among the first through $n^{th}$ emission periods EP1 through EPn may be spaced apart by about several to tens of horizontal periods.

The $k^{th}$ scan initialization signal GIk may have the gate-on voltage VGL during the second period t2, and may have the gate-off voltage VGH during the other periods. That is, the $k^{th}$ scan initialization signal GIk may have a scan initialization pulse generated as the gate-on voltage VGL during the second period t2. The gate-off voltage VGH may be a voltage having a higher level than the gate-on voltage VGL.

The $k^{th}$ scan write signal GWk may have the gate-on voltage VGL during the third period t3, and may have the gate-off voltage VGH during the other periods. That is, the $k^{th}$ scan write signal GWk may have a scan write pulse generated as the gate-on voltage VGL during the third period t3.

The $k^{th}$ scan control signal GCk may have the gate-on voltage VGL during the first through fourth periods t1 through t4 and the seventh period t7, and may have the gate-off voltage VGH during the other periods. That is, the $k^{th}$ scan control signal GCk may have scan control pulses generated as the gate-on voltage VGL during the first through fourth periods t1 through t4 and the seventh period t7.

The $k^{th}$ sweep signal SWPk may have sweep pulses in the form of triangular waves during the sixth period t6 and the ninth period t9, and may have the gate-off voltage VGH during the other periods. For example, a sweep pulse of the $k^{th}$ sweep signal SWPk may be in the form of a triangular wave that linearly decreases from the gate-off voltage VGH to the gate-on voltage VGL during the sixth period t6, and that immediately (e.g., substantially immediately) increases from the gate-on voltage VGL to the gate-off voltage VGH at the end of the sixth period t6.

The $k^{th}$ PWM emission signal PWEMk may have the gate-on voltage VGL during the fifth and sixth periods t5 and t6 and the eighth and ninth periods t8 and t9, and may have the gate-off voltage VGH during the other periods. That is, the $k^{th}$ PWM emission signal PWEMk may include PWM pulses generated as the gate-on voltage VGL during the fifth and sixth periods t5 and t6 and the eighth and ninth periods t8 and t9.

The $k^{th}$ PAM emission signal PAEMk may have the gate-on voltage VGL during the sixth period t6 and the ninth period t9, and may have the gate-off voltage VGH during the other periods. That is, the $k^{th}$ PAM emission signal PAEMk may include PAM pulses generated as the gate-on voltage VGL during the sixth period t6 and the ninth period t9. A PWM pulse width of the $k^{th}$ PWM emission signal PWEMk may be greater than a sweep pulse width of the $k^{th}$ sweep signal SWPk.

Figure 9:
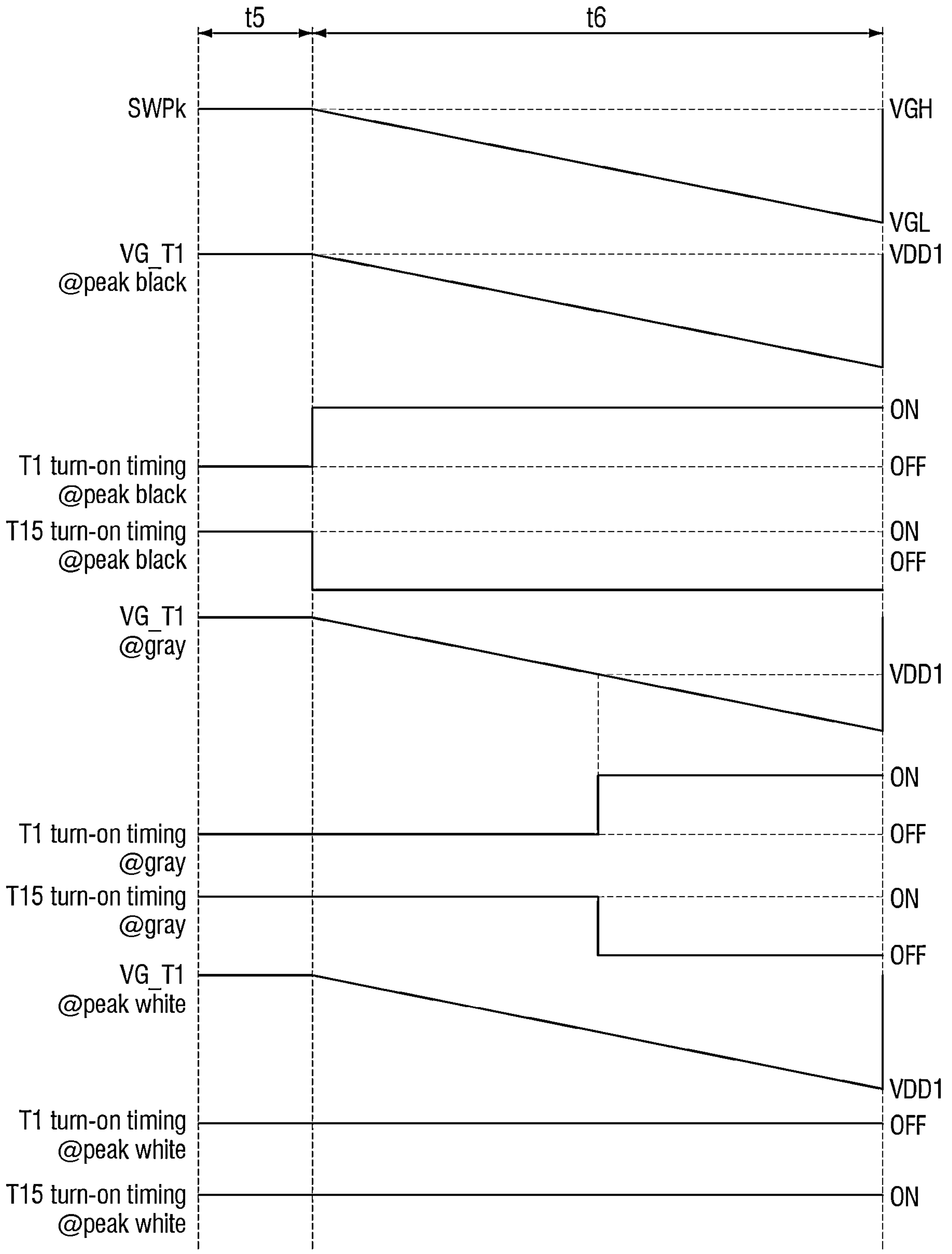
FIG. 9 is a timing diagram illustrating the $k^{th}$ sweep signal, the voltage of a gate electrode of a first transistor, the turn-on timing of the first transistor, and the turn-on timing of a fifteenth transistor during a fifth period and a sixth period according to one or more embodiments.
Figure 10:
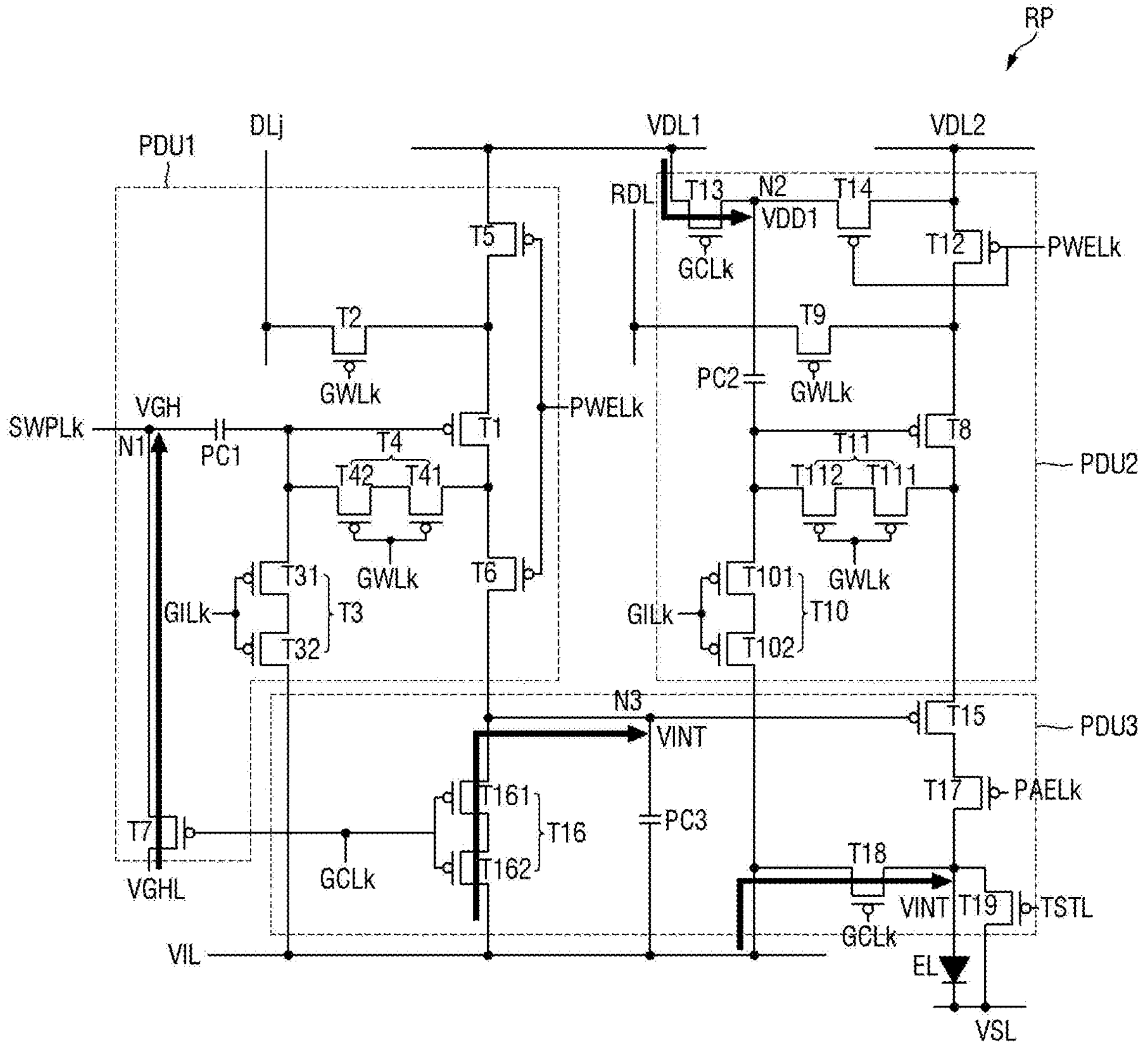
FIGS. 10, 11, 12 and 13 are circuit diagrams illustrating the operation of a first subpixel during a first period, a second period, a third period, and the sixth period of FIG. 8.
Figure 13:
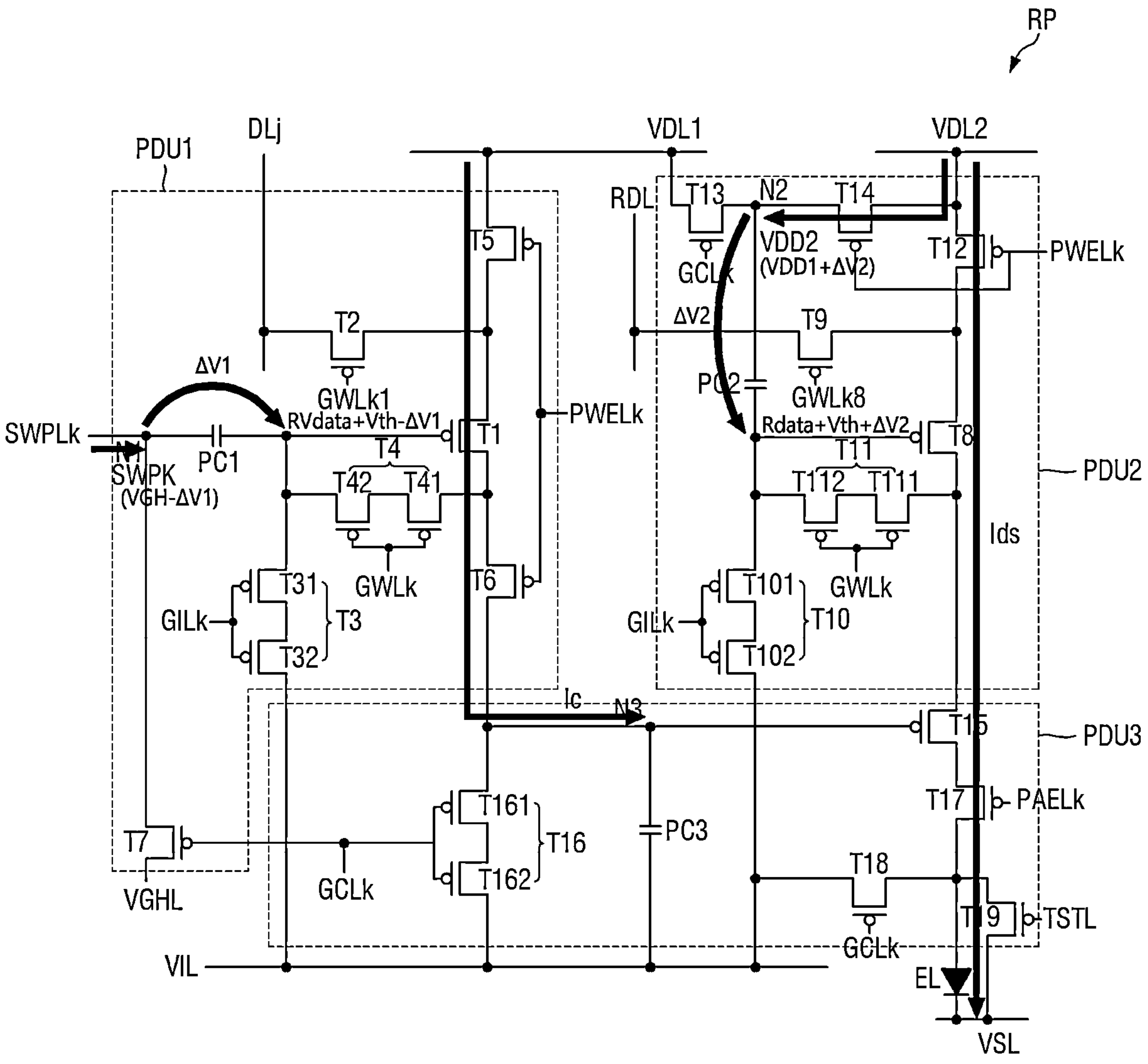

FIG. 9 is a timing diagram illustrating the $k^{th}$ sweep signal SWPk, the voltage of the gate electrode of the first transistor T1, the turn-on timing of the first transistor T1, and the turn-on timing of the fifteenth transistor T15 during the fifth period t5 and the sixth period t6 according to one or more embodiments. FIGS. 10 and 13 are circuit diagrams illustrating the operation of a first subpixel RP during the first period t1, the second period t2, the third period t3, and the sixth period t6 of FIG. 8.

The operation of the first subpixel RP during the first through ninth periods t1 through t9 will now be described in detail with reference to FIGS. 9 through 13.

First, during the first period t1, the seventh transistor T7, the thirteenth transistor T13, the sixteenth transistor T16, and the eighteenth transistor T18 are turned on by the $k^{th}$ scan control signal GCk of the gate-on voltage VGL, as illustrated in FIG. 10.

Due to the turn-on of the seventh transistor T7, the gate-off voltage VGH of the gate-off voltage line VGHL is applied to the first node N1. Due to the turn-on of the thirteenth transistor T13, the first power supply voltage VDD1 of the first power line VDL1 is applied to the second node N2.

Due to the turn-on of the sixteenth transistor T16, the third node N3 is initialized to the initialization voltage VINT of the initialization voltage line VIL. Due to the turn-on of the eighteenth transistor T18, the first electrode of the light emitting element EL is initialized to the initialization voltage VINT of the initialization voltage line VIL.

Figure 11:
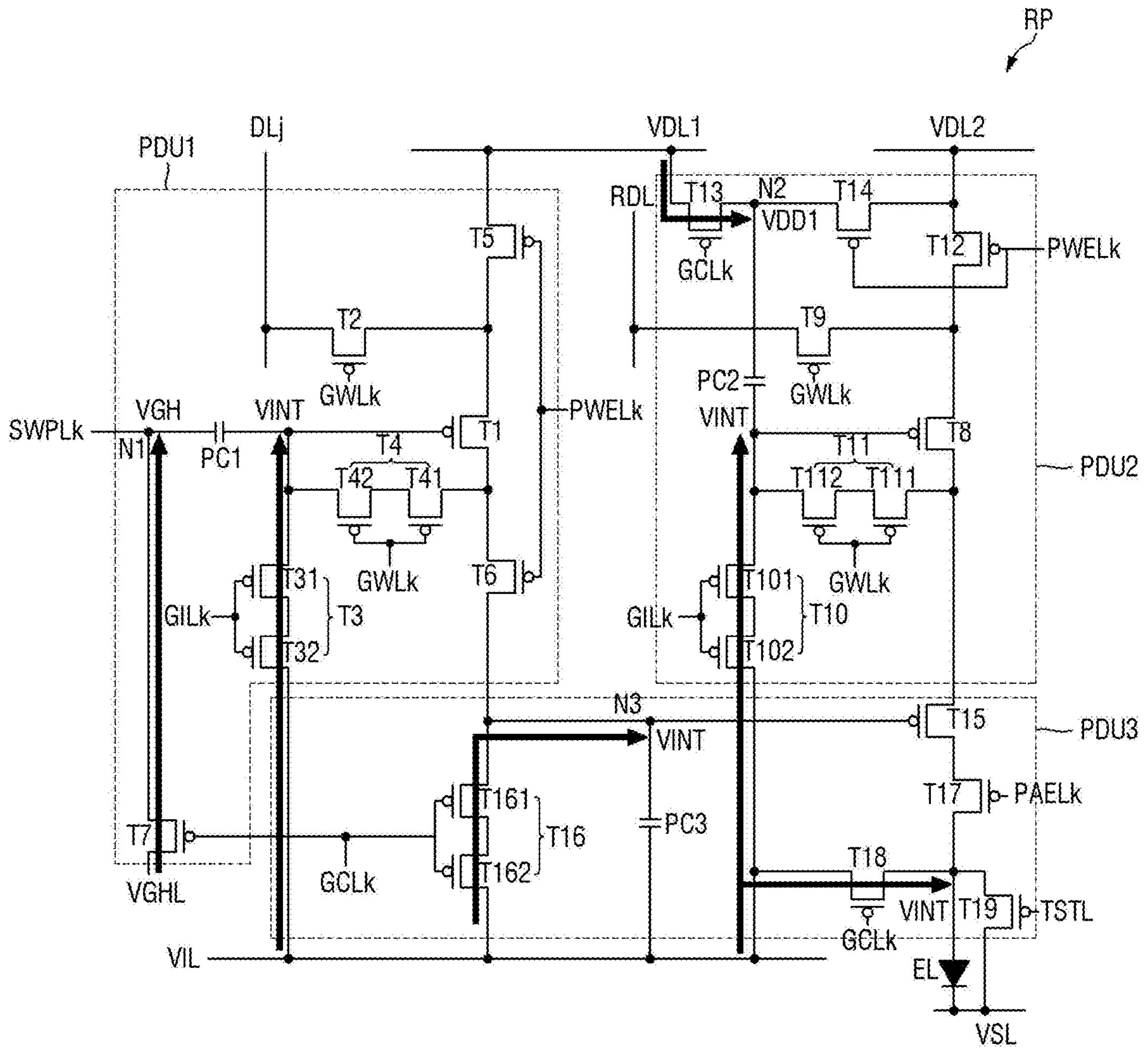

Second, during the second period t2, the seventh transistor T7, the thirteenth transistor T13, the sixteenth transistor T16, and the eighteenth transistor T18 are turned on by the $k^{th}$ scan control signal GCk of the gate-on voltage VGL, as illustrated in FIG. 11. In addition, during the second period t2, the third transistor T3 and the tenth transistor T10 are turned on by the $k^{th}$ scan initialization signal GIk of the gate-on voltage VGL.

The seventh transistor T7, the thirteenth transistor T13, the sixteenth transistor T16, and the eighteenth transistor T18 are substantially the same as described above in the first period t1.

Due to the turn-on of the third transistor T3, the gate electrode of the first transistor T1 is initialized to the initialization voltage VINT of the initialization voltage line VIL. In addition, due to the turn-on of the tenth transistor T10, the gate electrode of the eighth transistor T8 is initialized to the initialization voltage VINT of the initialization voltage line VIL.

Here, because the gate-off voltage VGH of the gate-off voltage line VGHL is applied to the first node N1, it is possible to reduce or prevent a voltage change of the gate electrode of the first transistor T1 being reflected in the $k^{th}$ sweep signal line SWPLk by the first capacitor PC1, and thus causing the gate-off voltage VGH of the $k^{th}$ sweep signal SWPk to be changed.

Figure 12:
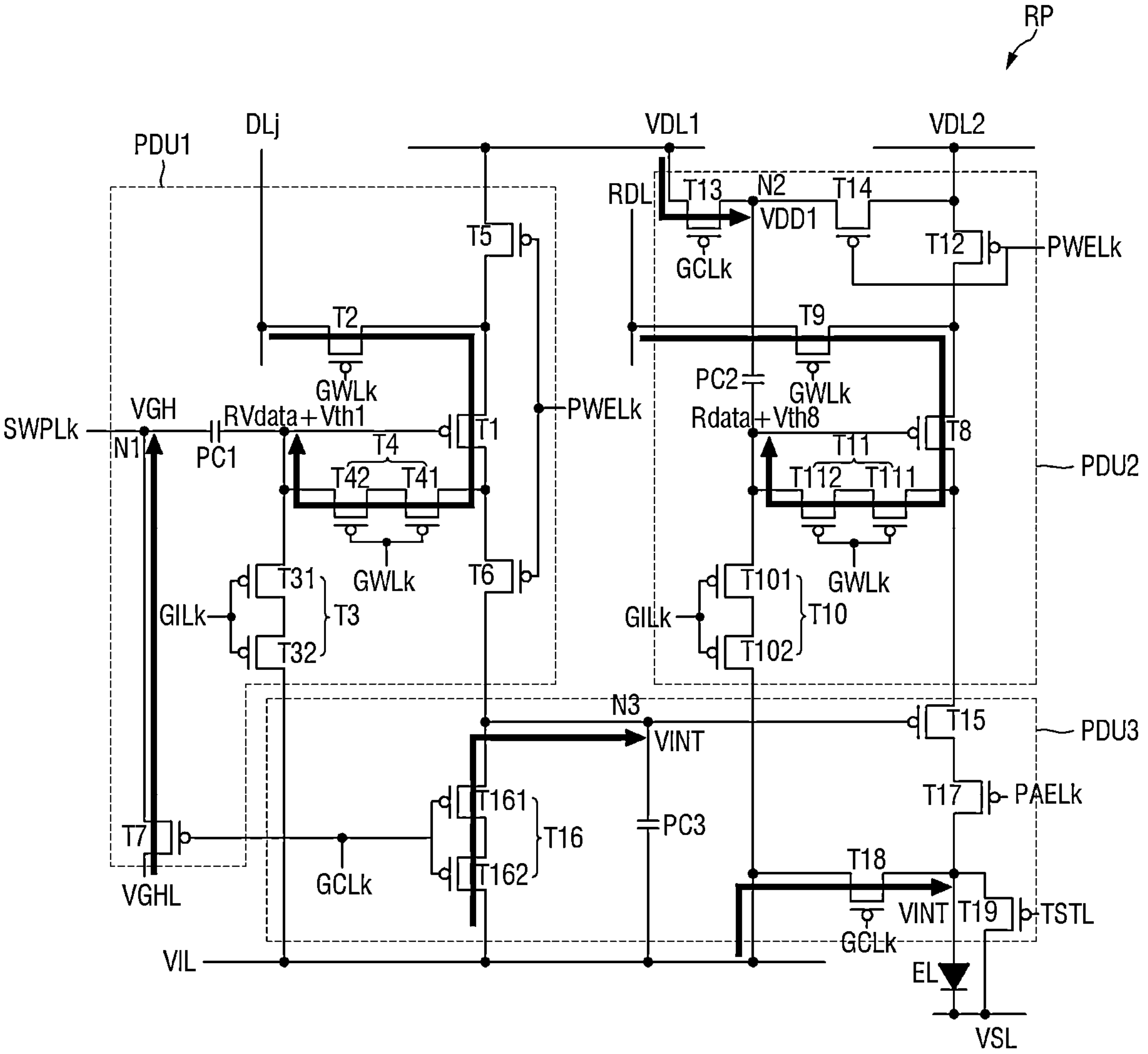

Third, during the third period t3, the seventh transistor T7, the thirteenth transistor T13, the sixteenth transistor T16, and the eighteenth transistor T18 are turned on by the $k^{th}$ scan control signal GCk of the gate-on voltage VGL, as illustrated in FIG. 12. In addition, during the third period t3, the second transistor T2, the fourth transistor T4, the ninth transistor T9, and the eleventh transistor T11 are turned on by the $k^{th}$ scan write signal GWk of the gate-on voltage VGL.

The seventh transistor T7, the thirteenth transistor T13, the sixteenth transistor T16, and the eighteenth transistor T18 are substantially the same as described above in the first period t1.

Due to the turn-on of the second transistor T2, the data voltage Vdata of the $j^{th}$ PWM data line DLj is applied to the first electrode of the first transistor T1. Due to the turn-on of the fourth transistor T4, the gate electrode and the second electrode of the first transistor T1 are connected to each other. Thus, the first transistor T1 operates as a diode.

Here, because a voltage between the gate electrode and the first electrode of the first transistor T1 (Vgs=Vint−Vdata) is greater than the threshold voltage Vth1, the first transistor T1 forms a current path until the voltage Vgs between the gate electrode and the first electrode reaches the threshold voltage Vth1. Therefore, the voltage of the gate electrode of the first transistor T1 may increase from "Vint" to "Vdata+Vth1". Because the first transistor T1 is formed as a P-type MOSFET, the threshold voltage Vth1 of the first transistor T1 may be less than 0 V.

In addition, because the gate-off voltage VGH of the gate-off voltage line VGHL is applied to the first node N1, it is possible to reduce or prevent a voltage change of the gate electrode of the first transistor T1 reflected in the $k^{th}$ sweep signal line SWPLk by the first capacitor PC1, and thus causing the gate-off voltage VGH of the $k^{th}$ sweep signal SWPk to be changed.

Due to the turn-on of the ninth transistor T9, the first PAM data voltage Rdata of the first PAM data line RDL is applied to the first electrode of the eighth transistor T8. Due to the turn-on of the ninth transistor T9, the gate electrode and the second electrode of the eighth transistor T8 are connected to each other. Thus, the eighth transistor T8 operates as a diode.

Here, because a voltage (Vgs=Vint−Rdata) between the gate electrode and the first electrode of the eighth transistor T8 is greater than the threshold voltage Vth8, the eighth transistor T8 forms a current path until the voltage Vgs between the gate electrode and the first electrode reaches the threshold voltage Vth8. Therefore, the voltage of the gate electrode of the eighth transistor T8 may increase from "Vint" to "Rdata+Vth8".

Fourth, during the fourth period t4, the seventh transistor T7, the thirteenth transistor T13, the sixteenth transistor T16, and the eighteenth transistor T18 are turned on by the $k^{th}$ scan control signal GCk of the gate-on voltage VGL.

The seventh transistor T7, the thirteenth transistor T13, the sixteenth transistor T16, and the eighteenth transistor T18 are substantially the same as described above in the first period t1.

Fifth, during the fifth period t5, the fifth transistor T5, the sixth transistor T6, the twelfth transistor T12, and the fourteenth transistor T14 are turned on by the $k^{th}$ PWM emission signal PWEMk of the gate-on voltage VGL, as illustrated in FIG. 13.

Due to the turn-on of the fifth transistor T5, the first power supply voltage VDD1 is applied to the first electrode of the first transistor T1. In addition, due to the turn-on of the sixth transistor T6, the second electrode of the first transistor T1 is connected to the third node N3. However, during the fifth period t5, the voltage (Vdata+Vth1) of the gate electrode of the first transistor T1 may be substantially the same as the first power supply voltage VDD1, or may be higher than the first power supply voltage VDD1. Therefore, during the fifth period t5, the first transistor T1 may be turned off.

In addition, due to the turn-on of the twelfth transistor T12, the first electrode of the eighth transistor T8 may be connected to the second power line VDL2.

In addition, due to the turn-on of the fourteenth transistor T14, the second power supply voltage VDD2 of the second power line VDL2 is applied to the second node N2. When the second power supply voltage VDD2 of the second power line VDL2 is changed by a voltage drop or the like, a voltage difference ΔV2 between the first power supply voltage VDD1 and the second power supply voltage VDD2 may be reflected in the gate electrode of the eighth transistor T8 by the second capacitor PC2.

Due to the turn-on of the fourteenth transistor T14, the driving current Ids flowing according to the voltage (Rdata+Vth8) of the gate electrode of the eighth transistor T8 may be supplied to the fifteenth transistor T15. The driving current Ids may not depend on the threshold voltage Vth8 of the eighth transistor T8 as shown in Equation 1, below.

$$Ids=k'\times(Vgs-Vth8)^2=k'\times(R\text{data}+Vth8-VDD2-Vth8)^2=k'\times(R\text{data}-VDD2)^2$$

where k' is a proportional coefficient determined by the structure and physical characteristics of the eighth transistor T8, Vth8 is the threshold voltage of the eighth transistor T8, VDD2 is the second power supply voltage, and Rdata is the first PAM data voltage.

Sixth, during the sixth period t6, the fifth transistor T5, the sixth transistor T6, the twelfth transistor T12, and the fourteenth transistor T14 are turned on by the $k^{th}$ PWM emission signal PWEMk of the gate-on voltage VGL, as illustrated in FIG. 13. During the sixth period t6, the seventeenth transistor T17 is turned on by the $k^{th}$ PAM emission signal PAEMk of the gate-on voltage VGL as illustrated in FIG. 13. During the sixth period t6, the $k^{th}$ sweep signal SWPk linearly decreases from the gate-off voltage VGH to the gate-on voltage VGL.

The fifth transistor T5, the sixth transistor T6, the twelfth transistor T12, and the fourteenth transistor T14 are substantially the same as described above in the fifth period t5.

Due to the turn-on of the seventeenth transistor T17, the first electrode of the light emitting element EL may be connected to the second electrode of the fifteenth transistor T15.

During the sixth period t6, the $k^{th}$ sweep signal SWPk linearly decreases from the gate-off voltage VGH to the gate-on voltage VGL, and a voltage change ΔV1 of the $k^{th}$ sweep signal SWPk is reflected in the gate electrode of the first transistor T1 by the first capacitor PC1. Therefore, the voltage of the gate electrode of the first transistor T1 may be Vdata+Vth1−ΔV1. That is, as the voltage of the $k^{th}$ sweep signal SWPk decreases during the sixth period t6, the voltage of the gate electrode of the first transistor T1 may linearly decrease.

The control current Ic flowing according to the voltage (Vdata+Vth1) of the gate electrode of the first transistor T1 during the sixth period t6 may not depend on the threshold voltage Vth1 of the first transistor T1, as shown in Equation 2, below.

$$Ids=k''\times(Vgs-Vth1)^2=k''\times(V\text{data}+Vth1-VDD1-Vth1)^2=k''\times(V\text{data}-VDD1), \quad (2)$$

where k" is a proportional coefficient determined by the structure and physical characteristics of the first transistor T1, Vth1 is the threshold voltage of the first transistor T1, VDD1 is the first power supply voltage, and Vdata is the data voltage.

A period, during which the control current Ic is applied to the third node N3, may vary according to the magnitude of the data voltage Vdata applied to the first transistor T1. Accordingly, because the voltage of the third node N3 varies according to the magnitude of the data voltage Vdata applied to the first transistor T1, the turn-on period of the fifteenth transistor T15 may be controlled. Therefore, by controlling the turn-on period of the fifteenth transistor T15, it is possible to control a period SET in which the driving current Ids is applied to the light emitting element EL during the sixth period t6.

As illustrated in FIG. 9, when the data voltage Vdata of the gate electrode of the first transistor T1 is a data voltage of a peak black grayscale level, as the voltage of the $k^{th}$ sweep signal SWPk decreases, a voltage VG_T1 of the gate electrode of the first transistor T1 may be lower than the first power supply voltage VDD1, which is the voltage of the first electrode of the first transistor T1, throughout the sixth period t6. Therefore, the first transistor T1 may be turned on throughout the sixth period t6. Accordingly, the control current Ic of the first transistor T1 may flow to the third node N3 throughout the sixth period t6, and the voltage of the third node N3 may increase to a high level VH in the fifth period t5. Therefore, the fifteenth transistor T15 may be turned off throughout the sixth period t6. Accordingly, because the driving current Ids is not applied to the light emitting element EL during the sixth period t6, the light emitting element EL may not emit light during the sixth period t6.

Also, as illustrated in FIG. 9, when the data voltage Vdata of the gate electrode of the first transistor T1 is a data voltage of a gray grayscale level, as the voltage of the $k^{th}$ sweep signal SWPk decreases, the voltage VG_T1 of the gate electrode of the first transistor T1 may have a higher level than the first power supply voltage VDD1 during a first sub-period t61 (e.g., see FIG. 8) and may have a lower level than the first power supply voltage VDD1 during a second sub-period t62 (e.g., see FIG. 8). Therefore, the first transistor T1 may be turned on during the second sub-period t62 of the sixth period t6. In this case, because the control current Ic of the first transistor T1 flows to the third node N3 during the second sub-period t62, the voltage of the third node N3 may have a high level VH during the second sub-period t62. Accordingly, the fifteenth transistor T15 may be turned off during the second sub-period t62. Therefore, the driving current Ids is applied to the light emitting element EL during the first sub-period t61, and is not applied to the light emitting element EL during the second sub-period t62. That is, the light emitting element EL may emit light during the first sub-period t61, which is a part of the sixth period t6. As the first subpixel RP expresses a gray grayscale level close to the peak black grayscale level, an emission period SET of the light emitting element EL may be reduced. In addition, as the first subpixel RP expresses a gray grayscale level close to a peak white grayscale level, the emission period SET of the light emitting element EL may be increased.

Also, as illustrated in FIG. 9, when the data voltage Vdata of the gate electrode of the first transistor T1 is a data voltage of the peak white grayscale level, the voltage VG_T1 of the gate electrode of the first transistor T1 may be higher than the first power supply voltage VDD1 during the sixth period t6 despite a reduction in the voltage of the $k^{th}$ sweep signal SWPk. Therefore, the first transistor T1 may be turned off throughout the sixth period t6. In this case, because the control current Ic of the first transistor T1 does not flow to the third node N3 throughout the sixth period t6, the voltage of the third node N3 may be maintained at the initialization voltage VINT. Accordingly, the fifteenth transistor T15 may be turned on throughout the sixth period t6. Therefore, the driving current Ids may be applied to the light emitting element EL throughout the sixth period t6, and the light emitting element EL may emit light throughout the sixth period t6.

Further, the $k^{th}$ sweep signal SWPk rises from the gate-on voltage VGL to the gate-off voltage VGH at the end of the sixth period t6. Therefore, at the end of the sixth period t6, the voltage VG_T1 of the gate electrode of the first transistor T1 may increase to be substantially equal to the voltage VG_T1 of the gate electrode of the first transistor T1 in fifth period t5.

As described above, the emission period of the light emitting element EL may be controlled by adjusting the PWM data voltage applied to the gate electrode of the first transistor T1. Therefore, the grayscale level or luminance displayed by the first subpixel RP may be adjusted by controlling the emission period of the light emitting element EL while maintaining the driving current Ids applied to the light emitting element EL as constant, rather than by adjusting the magnitude of the driving current Ids applied to the light emitting element EL.

When digital video data converted into data voltages is 8 bits, digital video data converted into a data voltage of the peak black grayscale level may be 0, and digital video data converted into a data voltage of the peak white grayscale level may be 255. In addition, digital video data of the black grayscale level may be 0 to 63, digital video data of the gray grayscale level may be 64 to 191, and digital video data of the white grayscale level may be 192 to 255.

In addition, the seventh period t7, the eighth period t8, and the ninth period t9 of each of the second through $n^{th}$ emission periods EP2 through EPn are substantially the same as the above-described first period t1, fifth period t5, and sixth period t6, respectively. That is, in each of the second through $n^{th}$ emission periods EP2 through EPn, after the third node N3 is initialized, a period, during which the driving current Ids generated according to the first PAM data voltage Rdata written to the gate electrode of the eighth transistor T8 is applied to the light emitting element EL, may be adjusted based on the data voltage Vdata written to the gate electrode of the first transistor T1 during the address period ADDR.

Because the test signal of the test signal line TSTL is applied as the gate-off voltage VGH during the active period ACT of the $N^{th}$ frame period, the nineteenth transistor T19 may be turned off during the active period ACT of the $N^{th}$ frame period.

A second subpixel GP and a third subpixel BP may operate in substantially the same manner as the first subpixel RP described above with reference to FIGS. 8 through 13. Therefore, a description of the operation of the second subpixel GP and the third subpixel BP will be omitted.

Referring again to FIG. 8, because the gate electrode and the second electrode of the first transistor T1 are connected to each other during the third period t3 of the address period ADDR, the first transistor T1 operates as a diode. Here, because the voltage (Vgs=Vint−Vdata) between the gate electrode and the first electrode of the first transistor T1 is greater than the threshold voltage Vth1, the first transistor T1 forms a current path until the voltage Vgs between the gate electrode and the first electrode reaches the threshold voltage Vth1. Therefore, the voltages of the gate electrode the second electrode of the first transistor T1 may increase to "Vdata+Vth1". For example, because "Vdata" at the peak white grayscale level is higher than "Vdata" at the peak black grayscale level, when the first subpixel RP expresses the peak white grayscale level, the voltage of the second electrode of the first transistor T1 may be very high (e.g., about 15 V or higher).

When the second electrode of the first transistor T1 is connected to the third node N3 due to the turn-on of the sixth transistor T6 during the fifth period t5 of the first emission period EP1, because the voltage of the second electrode of the first transistor T1 has a higher level than that of the third node N3, the voltage of the third node N3 may be increased by the voltage of the second electrode of the first transistor T1. Accordingly, during the sixth period t6, a voltage GV_T15 of the gate electrode of the fifteenth transistor T15 (or the voltage of the third node N3) may increase to a voltage (VINT+$\alpha$) higher than the initialization voltage VINT. Therefore, the driving current Ids flowing to the light emitting element EL through the fifteenth transistor T15 during the sixth period t6 may have a first current value CV1.

During the seventh period t7 of the second emission period EP2, the voltage of the third node N3 may be initialized to the initialization voltage VINT. Here, the voltage of the second electrode of the first transistor T1 during the seventh period t7 may be lower than that during the fourth period t4. Therefore, even if the second electrode of the first transistor T1 is connected to the third node N3 due to the turn-on of the sixth transistor T6 during the eighth period t8, an increase in the voltage of the third node N3 due to the voltage of the second electrode of the first transistor T1 may be relatively insignificant. Accordingly, the voltage GV_T15 of the gate electrode of the fifteenth transistor T15 (or the voltage of the third node N3) may be maintained at the initialization voltage VINT the ninth period t9. Therefore, the driving current Ids flowing to the light emitting element EL through the fifteenth transistor T15 during the ninth period t9 may have a second current value CV2 that is higher than the first current value CV1.

In summary, the magnitude of the driving current Ids flowing to the light emitting element EL during the first emission period EP1 immediately following the address period ADDR may be less than the magnitude of the driving current Ids flowing to the light emitting element EL during the second emission period EP2. Therefore, the luminance of the light emitting element EL during the first emission period EP1 may be lower than the luminance of the light emitting element EL during the second emission period EP2. That is, a step efficiency in which the luminance of the light emitting element EL increases in a stepwise manner may occur in the first emission period EP1 and the second emission period EP2. Accordingly, during one frame period, the first subpixel RP may express a luminance or grayscale level that is lower than the originally intended luminance or grayscale level.

A display device that may improve the step efficiency will now be described with reference to FIGS. 14 through 18.

Figure 14:
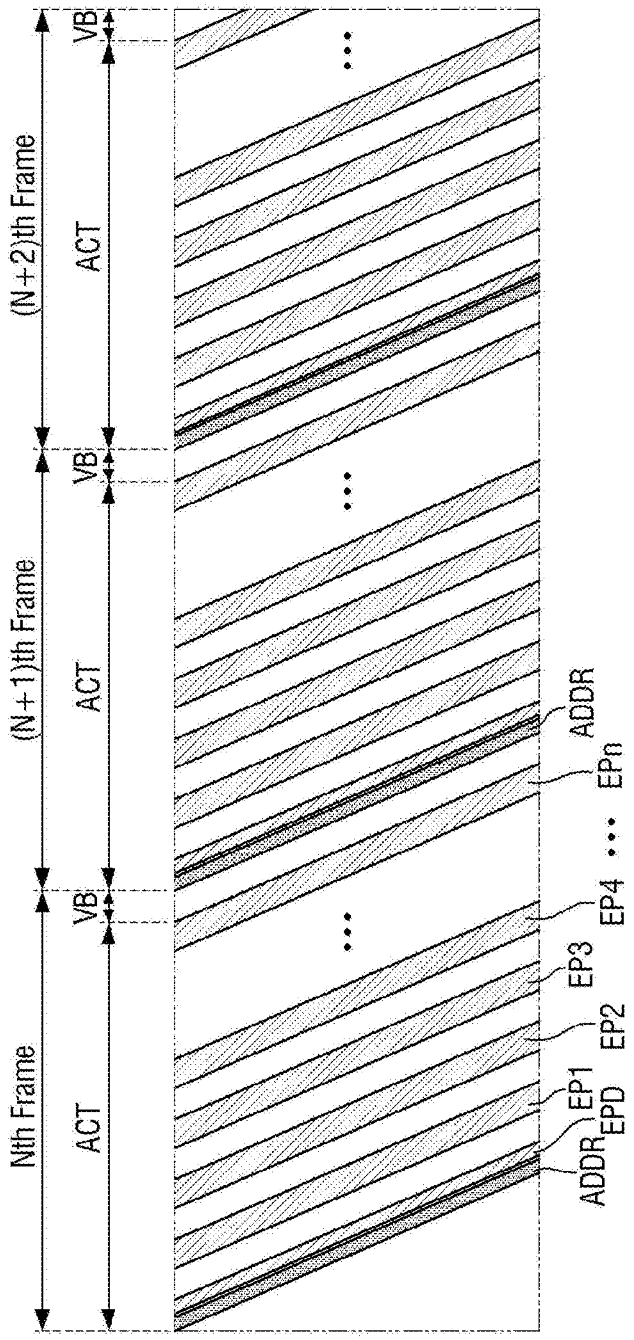
FIG. 14 is an example diagram illustrating the operation of a display device during $N^{th}$ through $(N+2)^{th}$ frame periods.

FIG. 14 is an example diagram illustrating the operation of a display device during $N^{th}$ through $(N+2)^{th}$ frame periods.

The embodiments corresponding to FIG. 14 are different from the embodiments corresponding to FIG. 5 in that an active period ACT further includes a dummy emission period EPD. In FIG. 14, differences from the embodiments corresponding to FIG. 5 will be mainly described.

Referring to FIG. 14, the active period ACT may include a data addressing period ADDR in which a data voltage and a first, second, or third PAM data voltage are supplied to each of subpixels RP, GP, and BP, the dummy emission period EPD in which a light emitting element EL of each of the subpixels RP, GP, and BP does not emit light, and a plurality of emission periods EP1 through EPn in which the light emitting element EL of each of the subpixels RP, GP, and BP emits light. The dummy emission period EPD may be located between the address period ADDR and a first emission period EP1.

The address period ADDR and the dummy emission period EPD may be shorter than each of the emission periods EP1 through EPn. For example, the address period ADDR and the dummy emission period EPD may be about five horizontal periods, and each of the emission periods EP1 through EPn may be about twelve horizontal periods, but embodiments of the present specification are not limited thereto. In addition, the active period ACT may include twenty-four emission periods, but the number of the emission periods EP1 through EPn of the active period ACT is not limited thereto.

The address period ADDR may overlap the dummy emission period EPD. In addition, the dummy emission period EPD may overlap at least any one of the emission periods EP1 through EPn. In FIG. 5, the dummy emission period EPD overlaps the first emission period EP1 and a second emission period EP2.

Figure 15:
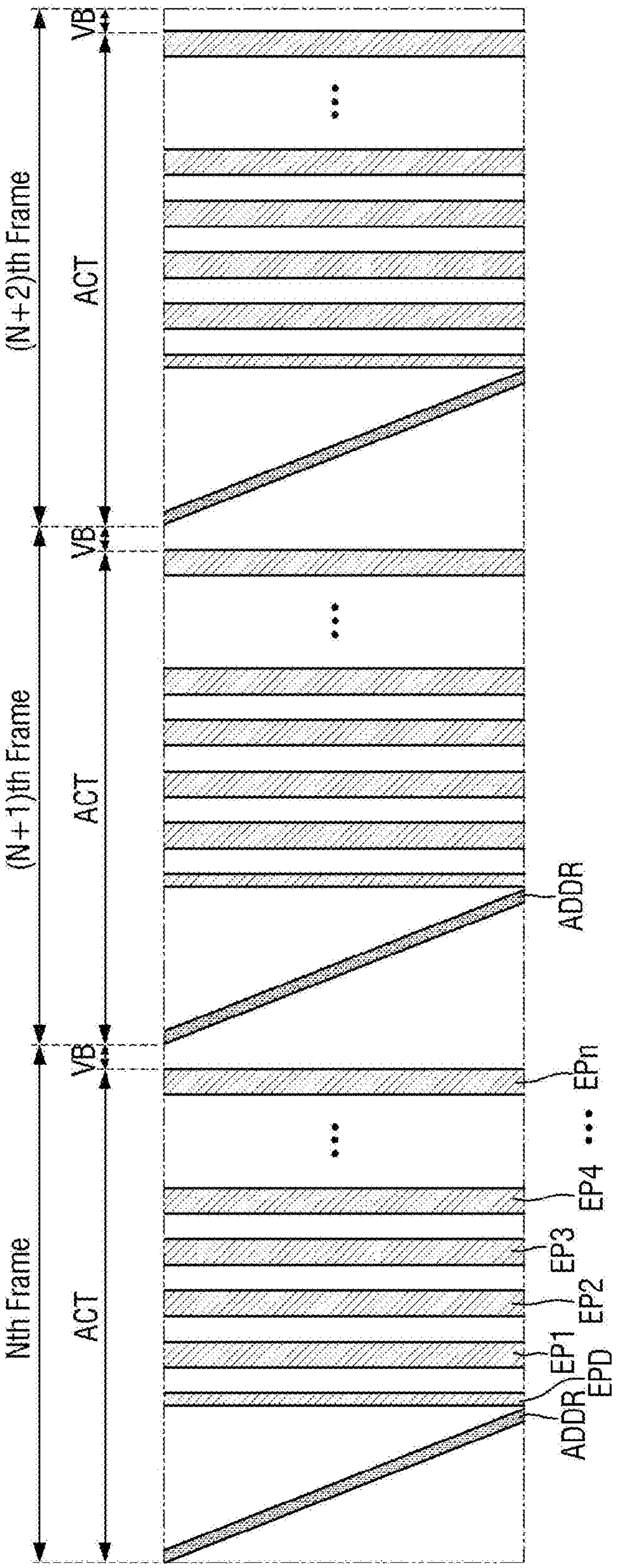
FIG. 15 is another example diagram illustrating the operation of the display device during the $N^{th}$ through $(N+2)^{th}$ frame periods.

FIG. 15 is another example diagram illustrating the operation of the display device during the $N^{th}$ through $(N+2)^{th}$ frame periods.

The embodiments corresponding to FIG. 15 are different from the embodiments corresponding to FIG. 14 in that the subpixels RP, GP, and BP of a display panel 100 concurrently or substantially simultaneously emit light in each of the emission periods EP1 through EPn.

Referring to FIG. 15, the address period ADDR might not overlap the dummy emission period EPD and the emission periods EP1 through EPn. The dummy emission period EPD might not overlap the emission periods EP1 through EPn. The dummy emission period EPD may occur after the address period ADDR completely ends.

Figure 16:
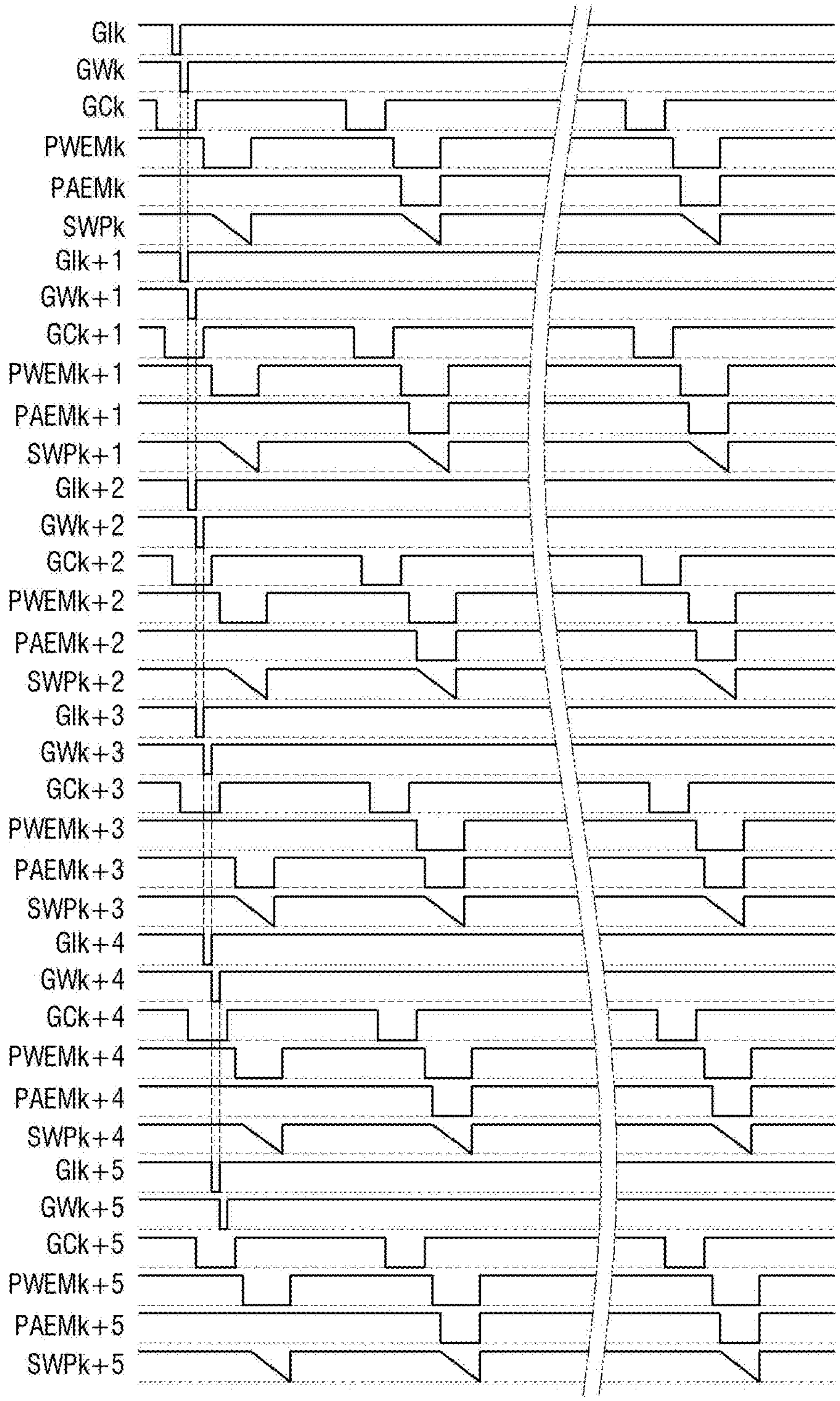
FIG. 16 is a waveform diagram of scan initialization signals, scan write signals, scan control signals, PWM emission signals, PAM emission signals, and sweep signals transmitted to subpixels located in $k^{th}$ through $(k+6)^{th}$ row lines during the $N^{th}$ frame period according to one or more embodiments.

FIG. 16 is a waveform diagram of scan initialization signals Glk through Glk+5, scan write signals GWk through GWk+5, scan control signals GCk through GCk+5, PWM emission signals PWEMk through PWEMk+5, PAM emission signals PAEMk through PAEMk+5, and sweep signals SWPk through SWPk+5 transmitted to subpixels RP, GP, and BP located in $k^{th}$ through $(k+6)^{th}$ row lines during the $N^{th}$ frame period according to one or more embodiments.

The embodiments corresponding to FIG. 16 are different from the embodiments corresponding to FIG. 7 in that a pulse overlapping a first pulse of each of the PWM emission signals PWEMk through PWEMk+5 is removed from each of the PAM emission signals PAEMk through PAEMk+5.

Referring to FIG. 16, a $k^{th}$ PAM emission signal PAEMk does not have a PAM pulse overlapping a first PWM pulse of a $k^{th}$ PWM emission signal PWEMk. That is, the first PWM pulse of the $k^{th}$ PWM emission signal PWEMk does not overlap PAM pulses of the $k^{th}$ PAM emission signal PAEMk. PWM pulses other than the first PWM pulse of the $k^{th}$ PWM emission signal PWEMk may overlap the PAM pulses of the $k^{th}$ PAM emission signal PAEMk, respectively.

A $(k+1)^{th}$ PAM emission signal PAEMk+1 does not have a PAM pulse overlapping a first PWM pulse of a $(k+1)^{th}$ PWM emission signal PWEMk+1. That is, the first PWM pulse of the $(k+1)^{th}$ PWM emission signal PWEMk+1 does not overlap any PAM pulse of the $(k+1)^{th}$ PAM emission signal PAEMk+1. PWM pulses other than the first PWM pulse of the $(k+1)^{th}$ PWM emission signal PWEMk+1 may overlap the PAM pulses of the $(k+1)^{th}$ PAM emission signal PAEMk+1, respectively.

A $(k+2)^{th}$ PAM emission signal PAEMk+2 does not have a PAM pulse overlapping a first PWM pulse of a $(k+2)^{th}$ PWM emission signal PWEMk+2. That is, the first PWM pulse of the $(k+2)^{th}$ PWM emission signal PWEMk+2 does not overlap any PAM pulse of the $(k+2)^{th}$ PAM emission signal PAEMk+2. PWM pulses other than the first PWM pulse of the $(k+2)^{th}$ PWM emission signal PWEMk+2 may overlap the PAM pulses of the $(k+2)^{th}$ PAM emission signal PAEMk+2, respectively.

A $(k+3)^{th}$ PAM emission signal PAEMk+3 does not have a PAM pulse overlapping a first PWM pulse of a $(k+3)^{th}$ PWM emission signal PWEMk+3. That is, the first PWM pulse of the $(k+3)^{th}$ PWM emission signal PWEMk+3 does not overlap any PAM pulse of the $(k+3)^{th}$ PAM emission signal PAEMk+3. PWM pulses other than the first PWM pulse of the $(k+3)^{th}$ PWM emission signal PWEMk+3 may overlap the PAM pulses of the $(k+3)^{th}$ PAM emission signal PAEMk+3, respectively.

A $(k+4)^{th}$ PAM emission signal PAEMk+4 does not have a PAM pulse overlapping a first PWM pulse of a $(k+4)^{th}$ PWM emission signal PWEMk+4. That is, the first PWM pulse of the $(k+4)^{th}$ PWM emission signal PWEMk+4 does not overlap any PAM pulse of the $(k+4)^{th}$ PAM emission signal PAEMk+4. PWM pulses other than the first PWM pulse of the $(k+4)^{th}$ PWM emission signal PWEMk+4 may overlap the PAM pulses of the $(k+4)^{th}$ PAM emission signal PAEMk+4, respectively.

A $(k+5)^{th}$ PAM emission signal PAEMk+5 does not have a PAM pulse overlapping a first PWM pulse of a $(k+5)^{th}$ PWM emission signal PWEMk+5. That is, the first PWM pulse of the $(k+5)^{th}$ PWM emission signal PWEMk+5 does not overlap any PAM pulse of the $(k+5)^{th}$ PAM emission signal PAEMk+5. PWM pulses other than the first PWM pulse of the $(k+5)^{th}$ PWM emission signal PWEMk+5 may overlap the PAM pulses of the $(k+5)^{th}$ PAM emission signal PAEMk+5, respectively.

Figure 17:
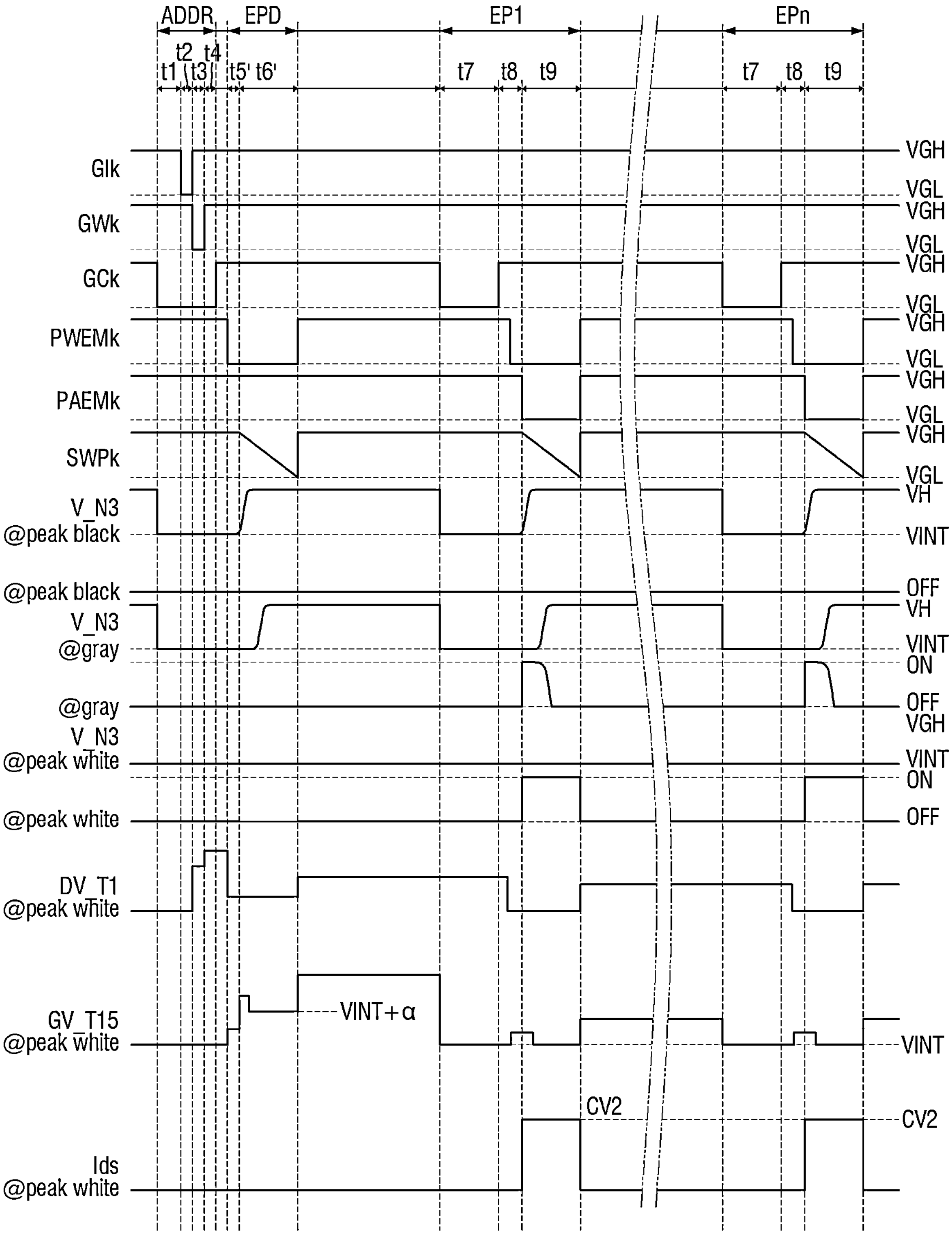
FIG. 17 is a waveform diagram illustrating periods in which a $k^{th}$ scan initialization signal, a $k^{th}$ scan write signal, a $k^{th}$ scan control signal, a $k^{th}$ PWM emission signal, a $k^{th}$ PAM emission signal and a $k^{th}$ sweep signal transmitted to each of the subpixels located in the $k^{th}$ row line, the voltage of a third node of a first subpixel, and a driving current applied to a light emitting element are applied in the $N^{th}$ frame period according to one or more embodiments.

FIG. 17 is a waveform diagram illustrating periods in which a $k^{th}$ scan initialization signal Glk, a $k^{th}$ scan write signal GWk, a $k^{th}$ scan control signal GCk, the $k^{th}$ PWM emission signal PWEMk, the $k^{th}$ PAM emission signal PAEMk, and a $k^{th}$ sweep signal SWPk, which are transmitted to each of the subpixels RP, GP, and BP located in the $k^{th}$ row line, along with the voltage of a third node N3 of a first subpixel RP, and a driving current Ids applied to the light emitting element EL are applied in the $N^{th}$ frame period according to one or more embodiments.

The embodiments corresponding to FIG. 17 are different from the embodiments corresponding to FIG. 8 in that the $k^{th}$ PAM emission signal PAEMk has a gate-off voltage VGH during a sixth period t6'.

Referring to FIG. 17, the dummy emission period EPD may include a fifth period t5' and the sixth period t6'. The $k^{th}$ PAM emission signal PAEMk may have the gate-off voltage VGH during the dummy emission period EPD.

The $k^{th}$ PAM emission signal PAEMk may have a PAM pulse generated as a gate-on voltage VGL in each of the emission periods EP1 through EPn. The $k^{th}$ PAM emission signal PAEMk may have the gate-off voltage VGH during a seventh period t7 and an eighth period t8 in each of the emission periods EP1 through EPn, and may have the gate-on voltage VGL during a ninth period t9.

In each of the emission periods EP1 through EPn, a pulse width of a PAM pulse of the $k^{th}$ PAM emission signal PAEMk may be smaller than a pulse width of a PWM pulse of the $k^{th}$ PWM emission signal PWEMk. In some embodiments, in each of the emission periods EP1 through EPn, the pulse width of the PAM pulse of the $k^{th}$ PAM emission signal PAEMk may be less than a pulse width of a sweep pulse of the $k^{th}$ sweep signal SWPk.

Figure 18:
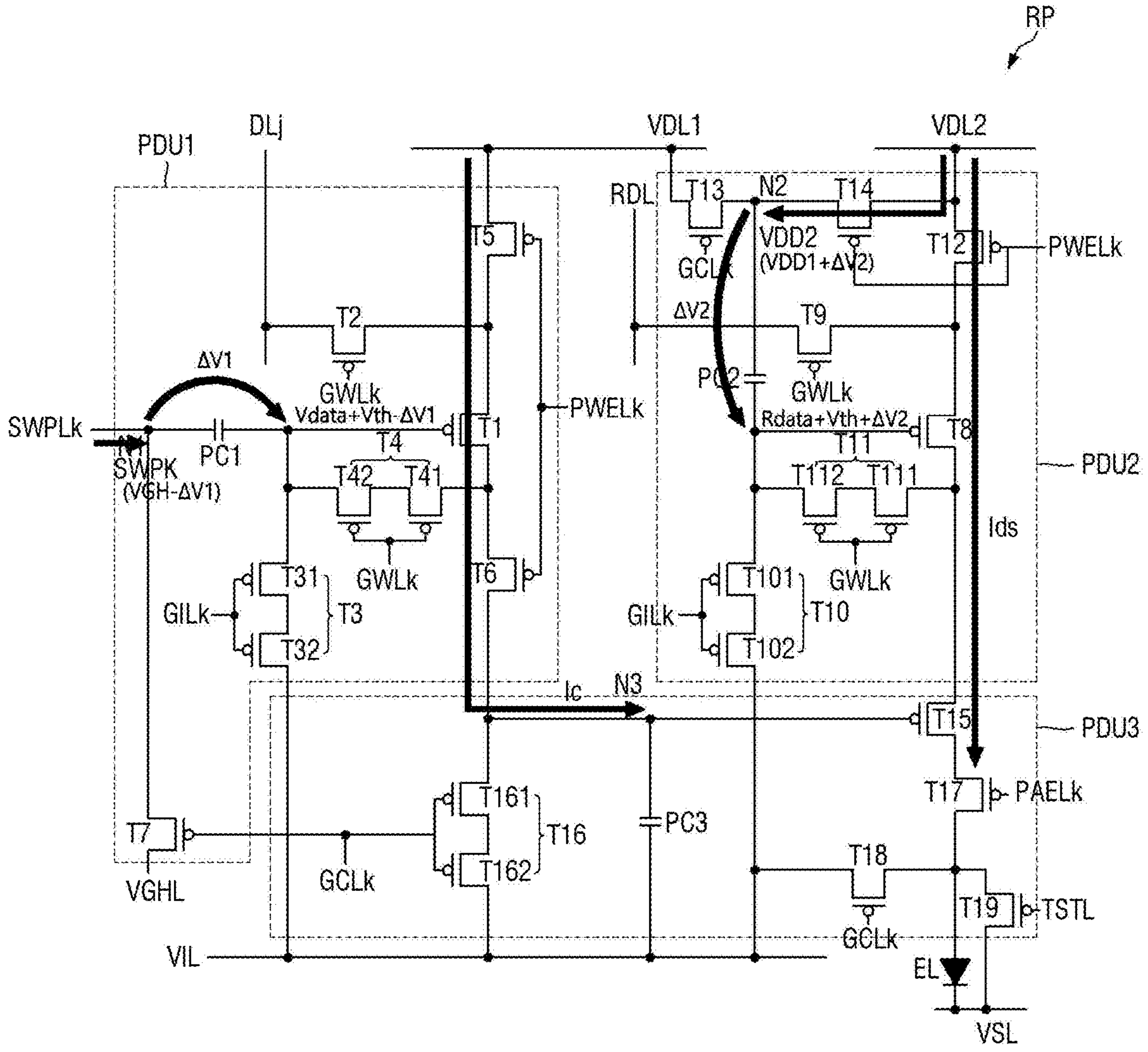
FIG. 18 is a circuit diagram illustrating the operation of a first subpixel during a sixth period of FIG. 17.

FIG. 18 is a circuit diagram illustrating the operation of a first subpixel RP during the sixth period t6' of FIG. 17.

The operation of the first subpixel RP during the sixth period t6' will now be described with reference to FIGS. 17 and 18.

During the sixth period t6', a fifth transistor T5, a sixth transistor T6, a twelfth transistor T12, and a fourteenth transistor T14 are turned on by the $k^{th}$ PWM emission signal PWEMk of the gate-on voltage VGL. During the sixth period t6', the $k^{th}$ sweep signal SWPk linearly decreases from the gate-off voltage VGH to the gate-on voltage VGL.

During the sixth period t6', the operation of the fifth transistor T5, the sixth transistor T6, the twelfth transistor T12, and the fourteenth transistor T14 is substantially the same as that described above with reference to FIG. 13, and thus a description thereof will be omitted.

During the sixth period t6', due to the turn-off of a seventeenth transistor T17, a first electrode of the light emitting element EL is not connected to a second electrode of a fifteenth transistor T15. Therefore, the driving current Ids of an eighth transistor T8 is not supplied to the light emitting element EL during the sixth period t6'. Accordingly, the light emitting element EL does not emit light during the sixth period t6'.

In summary, the dummy emission period EPD in which the light emitting element EL does not emit light is added between the address period ADDR and the first emission period EP1. Therefore, after the voltage of a second electrode of a first transistor T1 increases to "Vdata+Vth1" during the address period ADDR, it is possible to reduce or prevent the likelihood of the second electrode of the first transistor T1 from being connected to a gate electrode of the fifteenth transistor T15 during the first emission period EP1, and thus causing an increase in the voltage of the gate electrode of the fifteenth transistor T15. That is, because the voltage of the second electrode of the first transistor T1 increases to "Vdata+Vth1" during the address period ADDR, the voltage of the gate electrode of the fifteenth transistor T15 increases during the dummy emission period EPD, not the first emission period EP1. However, during the dummy emission period EPD, due to the turn-off of the seventeenth transistor T17, the driving current Ids is not supplied to the light emitting element EL. Therefore, the luminance of the light emitting element EL during the first emission period EP1 is lower than the luminance of the light emitting element EL during the second emission period EP2. Accordingly, it is possible to reduce or prevent the step efficiency in which the luminance of the light emitting element EL increases in a stepwise manner from occurring in the first emission period EP1 and the second emission period EP2. That is, the step efficiency may be improved.

Figure 19:
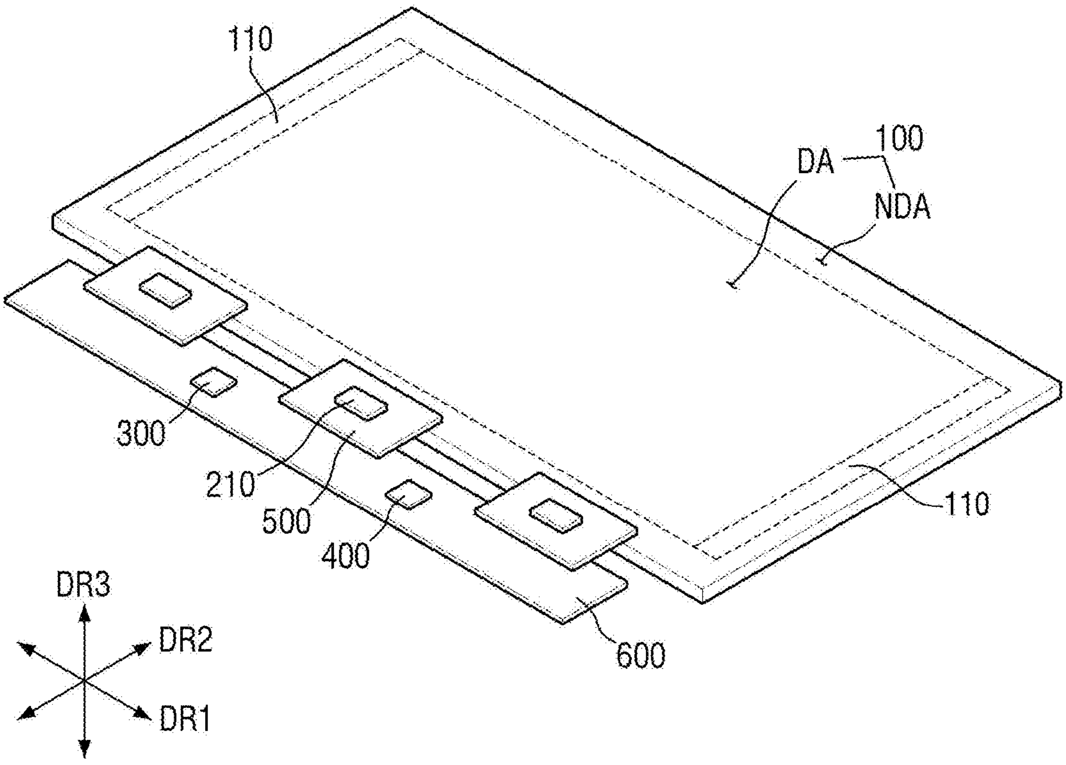
FIG. 19 is a perspective view of a display device according to one or more embodiments.

FIG. 19 is a perspective view of a display device 10 according to one or more embodiments.

Referring to FIG. 19, the display device 10 is a device for displaying moving images or still images. The display device 10 may be used as a display screen in portable electronic devices such as mobile phones, smartphones, tablet personal computers (PCs), smart watches, watch phones, mobile communication terminals, electronic notebooks, electronic books, portable multimedia players (PMPs), navigation devices and ultra-mobile PCs (UMPCs), as well as in various products such as televisions, notebook computers, monitors, billboards and the Internet of things (IoT).

The display device 10 includes a display panel 100, source driving circuits 210, and source circuit boards 500.

The display panel 100 may be shaped like a rectangular plane having long sides in the first direction (DR1, or X-axis direction) and short sides in the second direction (DR2, or Y-axis direction) intersecting the first direction (X-axis direction). Each corner where a long side extending in the first direction (X-axis direction) meets a short side extending in the second direction (Y-axis direction) may be rounded with a predetermined curvature or may be right-angled. The planar shape of the display panel 100 is not limited to a quadrangular shape, but may also be another polygonal shape, a circular shape, or an oval shape. The display panel 100 may be formed flat, but embodiments of the present disclosure are not limited thereto. For example, the display panel 100 may include a curved part formed at left and right ends and having a constant or varying curvature. In addition, the display panel 100 may be formed to be flexible so that it may be curved, bent, folded, or rolled.

The display panel 100 may include a display area DA for displaying an image, and a non-display area NDA located around the display area DA. The display area DA may occupy most of the display panel 100. The display area DA may be located in the center of the display panel 100. In the display area DA, subpixels RP, GP, and BP may be located to display an image. Each of the subpixels RP, GP, and BP may include an inorganic light emitting element having an inorganic semiconductor as a light emitting element.

The non-display area NDA may neighbor the display area DA. The non-display area NDA may be an area outside the display area DA. The non-display area NDA may surround the display area DA. The non-display area NDA may be an edge area of the display panel 100.

In the non-display area NDA, a scan driver 110 may be located. Although the scan driver 110 is located on both sides of the display area DA (e.g., on a left side and a right side of the display area DA) in the drawing, embodiments of the present specification are not limited thereto. The scan driver 110 may also be located on one side of the display area DA.

In addition, in the non-display area NDA, display pads may be located for connection to the source circuit boards 500. The display pads may be located on an edge of the display panel 100. For example, the display pads may be located on a lower edge of the display panel 100.

The source circuit boards 500 may be located on the display pads located on an edge of the display panel 100. The source circuit boards 500 may be attached to the display pads by using a conductive adhesive member such as an anisotropic conductive film. Therefore, the source circuit boards 500 may be electrically connected to signal lines of the display panel 100. The source circuit boards 500 may be flexible printed circuit boards, printed circuit boards, or flexible films such as chip-on films.

A source driver 200 may include the source driving circuits 210. The source driving circuits 210 may generate data voltages, and may supply the data voltages to the display panel 100 through the source circuit boards 500.

The source driving circuits 210 may be formed as integrated circuits, and may be attached onto the source circuit boards 500, respectively. Alternatively, the source driving circuits 210 may be attached onto the display panel 100 using a chip-on-glass (COG) method, a chip-on-plastic (COP) method, or an ultrasonic bonding method.

A control circuit board 600 may be attached to the source circuit boards 500 through a conductive adhesive member such as an anisotropic conductive film. The control circuit board 600 may be electrically connected to the source circuit boards 500. The control circuit board 600 may be a flexible printed circuit board or a printed circuit board.

Each of a timing controller 300 and a power supply unit 400 may be formed as an integrated circuit and attached onto the control circuit board 600. The timing controller 300 may supply digital video data DATA and timing signals TS to the source driving circuits 210. The power supply unit 400 may generate and output voltages for driving the subpixels RP, GP, and BP of the display panel 100 and the source driving circuits 210.

Figure 20:
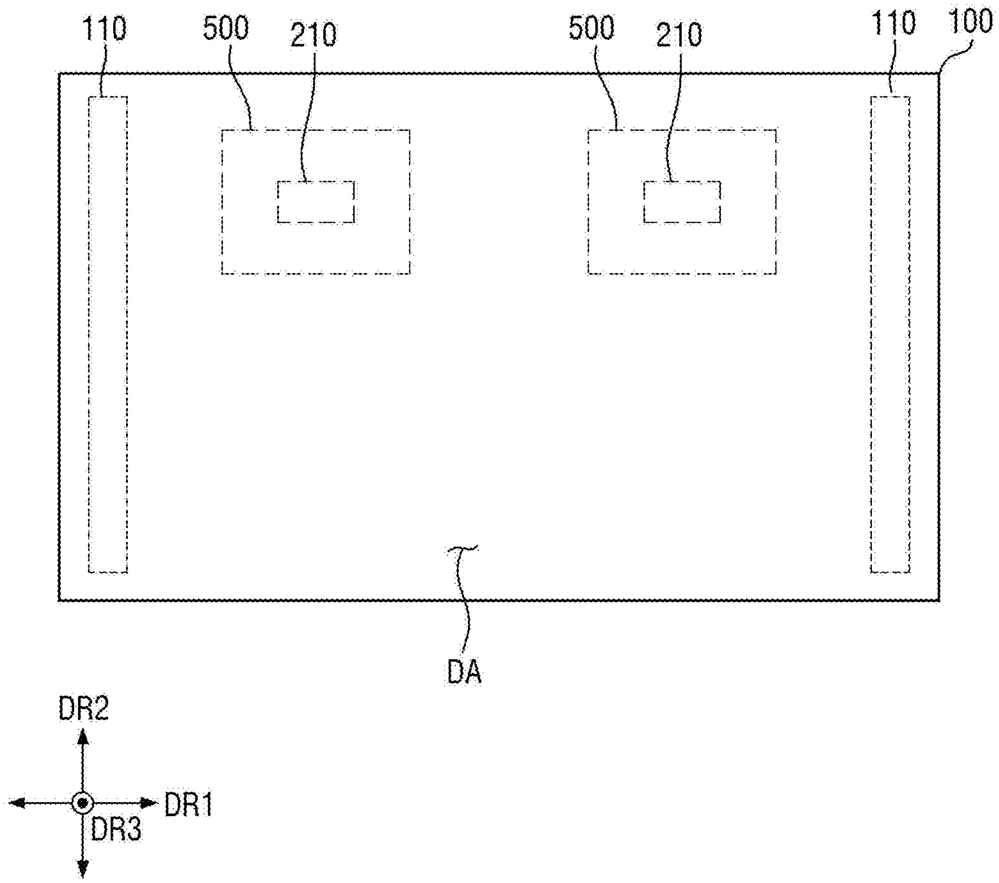
FIG. 20 is a plan view of a display device according to one or more embodiments.

FIG. 20 is a plan view of a display device according to one or more embodiments.

The embodiments corresponding to FIG. 20 are different from the embodiments corresponding to FIG. 19 in that a display panel 100 does not include a non-display area NDA, scan drivers 110 are located in a display area DA, and source circuit boards 500 on which source driving circuits 210 are mounted are located on a rear surface of the display panel 100. In FIG. 20, differences from the embodiments corresponding to FIG. 19 will be mainly described.

Referring to FIG. 20, the scan drivers 110 may be located in the display area DA. The scan drivers 110 might not overlap subpixels RP, GP, and BP, and may be located between the subpixels RP, GP, and BP.

The source circuit boards 500 may be located on the rear surface of the display panel 100. In this case, display pads connected to the source circuit boards 500 may be located on the rear surface of the display panel 100. In addition, pad connection electrodes penetrating the display panel 100 and respectively connected to the display pads may be located in the display area DA of the display panel 100.

Figure 21:
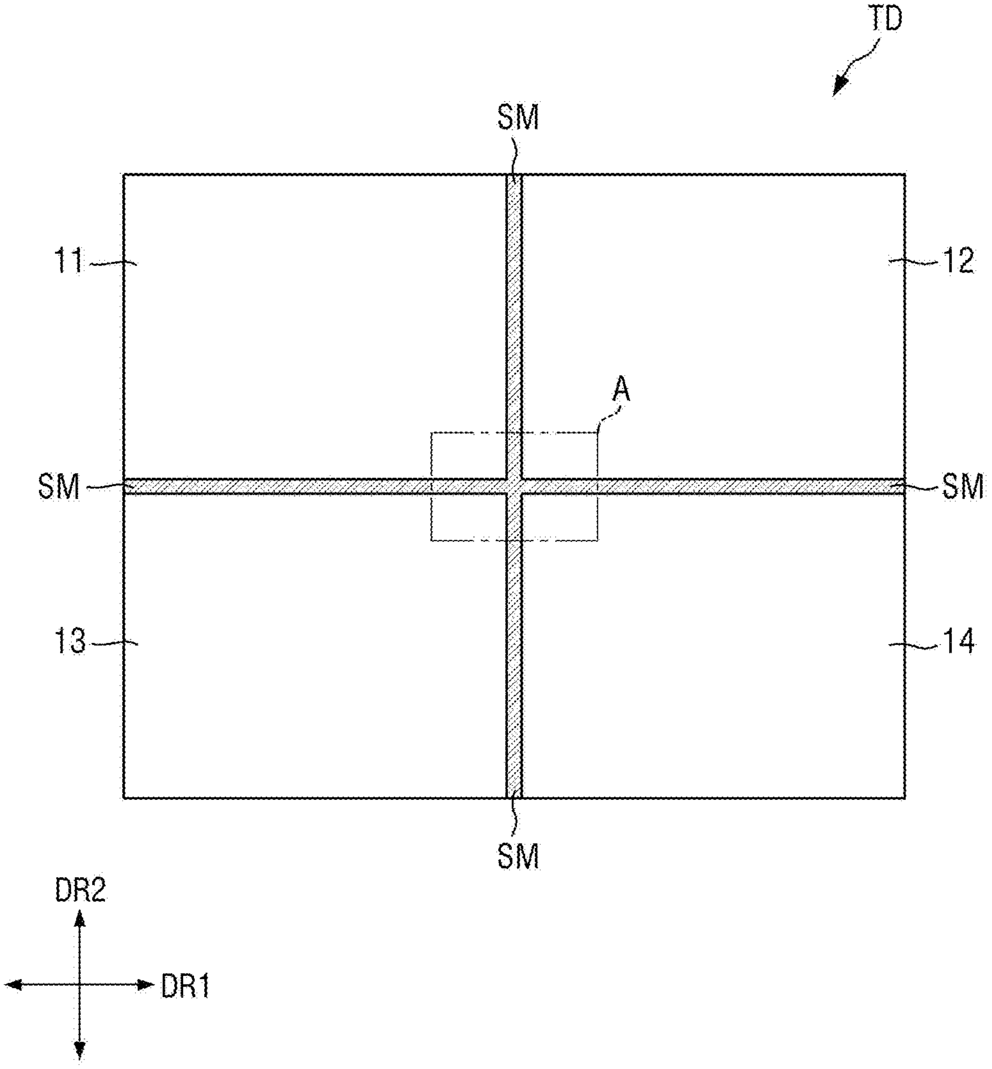
FIG. 21 is a plan view of a tiled display device including the display device illustrated in FIG. 20.

FIG. 21 is a plan view of a tiled display device TD including the display device illustrated in FIG. 20.

Referring to FIG. 21, the tiled display device TD may include a plurality of display devices 11 through 14. For example, the tiled display device TD may include a first display device 11, a second display device 12, a third display device 13, and a fourth display device 14.

The display devices 11 through 14 may be arranged in a grid shape. For example, the first display device 11 and the second display device 12 may be located in a first direction DR1. The first display device 11 and the third display device 13 may be located in a second direction DR2. The third display device 13 and the fourth display device 14 may be located in the first direction DR1. The second display device 12 and the fourth display device 14 may be located in the second direction DR2.

The number and arrangement of the display devices 11 through 14 in the tiled display device TD are not limited to those illustrated in FIG. 21. The number and arrangement of the display devices 11 through 14 in the tiled display device TD may be determined by the size of each of the display devices 11 through 14 and the tiled display device TD and the shape of the tiled display device TD.

The display devices 11 through 14 may have the same size, but embodiments of the present specification are not limited thereto. For example, the display devices 11 through 14 may also have different sizes.

Each of the display devices 11 through 14 may be shaped like a rectangle including long sides and short sides. The long sides or short sides of the display devices 11 through 14 may be respectively connected to each other. Some or all of the display devices 11 through 14 may be located at an edge of the tiled display device TD and may form a side of the tiled display device TD. At least one of the display devices 11 through 14 may be located at at least one corner of the tiled display device TD and may form two adjacent sides of the tiled display device TD. At least one of the display devices 11 through 14 may be surrounded by other display devices.

The tiled display device TD may include a seam SM located between the display devices 11 through 14. For example, the seam SM may be located between the first display device 11 and the second display device 12, between the first display device 11 and the third display device 13, between the second display device 12 and the fourth display device 14, and between the third display device 13 and the fourth display device 14.

The seam SM may include a coupling member or an adhesive member. In this case, the display devices 11 through 14 may be connected to each other through the coupling member or the adhesive member of the seam SM.

When the scan drivers 110 are located in the display area DA as illustrated in FIG. 20, and when the source circuit boards 500 are located on the rear surface of the display panel 100, because the non-display area NDA in which the subpixels RP, GP, and BP are not located may be eliminated from each of the display devices 11 through 14, it is possible to reduce, minimize, or prevent visibility of the seam SM in the tiled display device TD. Accordingly, despite the seam SM, it is possible to reduce or prevent the likelihood of images of the display devices 11 through 14 being seen separate from each other, thereby increasing the degree of immersion in the images of the tiled display device TD.

However, the aspects of the present disclosure are not restricted to the one set forth herein. The above and other aspects of the present disclosure will become more apparent to one of daily skill in the art to which the present disclosure pertains by referencing the claims, with functional equivalents thereof to be included therein.

What is claimed is:

1. A display device comprising:

a pulse width modulation (PWM) line configured to receive a PWM signal;

a pulse amplitude modulation (PAM) line configured to receive a PAM signal;

a first data line configured to receive a first data voltage;

a second data line configured to receive a second data voltage; and a subpixel including a light emitting element, wherein the subpixel is configured to:

supply a control current to a node according to the first data voltage when the PWM signal has a gate-on voltage;

generate a driving current according to the second data voltage when the PAM signal has the gate-on voltage; and supply the driving current to the light emitting element according to a voltage of the node when the PAM signal has the gate-on voltage, wherein the PWM signal has a plurality of PWM pulses during one frame period, wherein the PAM signal has a plurality of PAM pulses during the one frame period, wherein a first PWM pulse of the PWM pulses is prior to the plurality of PAM pulses during the one frame period, and wherein the first PWM pulse does not overlap the plurality of PAM pulses during the one frame period.

2. The display device of claim 1, wherein a number of the plurality of PWM pulses during the one frame period is greater than a number of the plurality of PAM pulses during the one frame period.

3. The display device of claim 1, wherein a width of each of the plurality of PWM pulses is greater than a width of each of the plurality of PAM pulses.

4. The display device of claim 1, wherein PWM pulses other than the first PWM pulse from among the plurality of PWM pulses respectively overlap the plurality of PAM pulses.

5. The display device of claim 1, wherein the plurality of PWM pulses has first to Nth PWM pulses, wherein the plurality of PAM pulses has first to Mth PAM pulses, and wherein N is greater than M.

6. The display device of claim 5, wherein second to Nth PWM pulses from among the plurality of PWM pulses respectively overlap the first to Mth PAM pulses.

7. The display device of claim 1, wherein the light emitting element does not emit light when the first PWM pulse has the gate-on voltage.

8. The display device of claim 1, further comprising a sweep signal line configured to receive a sweep signal, wherein the sweep signal has a plurality of sweep pulses during the one frame period, and wherein each of the plurality of sweep pulses linearly changes from a gate-off voltage to the gate-on voltage.

9. The display device of claim 8, wherein the subpixel is configured to generate the control current according to applying a voltage change of each of the plurality of sweep pulses to the first data voltage.

10. The display device of claim 8, wherein a number of the plurality of sweep pulses is greater than the number of the plurality of PAM pulses.

11. The display device of claim 8, wherein a width of each of the plurality of sweep pulses is the same as a width of each of the plurality of PAM pulses.

12. The display device of claim 8, wherein a width of each of the plurality of sweep pulses is less than a width of each of the plurality of PWM pulses.

13. The display device of claim 8, wherein a first sweep pulse of the plurality of sweep pulses is prior to the PAM pulses during the one frame period.

14. The display device of claim 8, wherein the first PWM pulse does not overlap the plurality of sweep pulses.

15. The display device of claim 8, wherein PWM pulses other than the first PWM pulse from among the plurality of PWM pulses respectively overlap the plurality of sweep pulses.

16. The display device of claim 8, wherein the plurality of PWM pulses has first to Nth PWM pulses, wherein the plurality of sweep pulses has first to Mth sweep pulses, and wherein N is greater than M.

17. The display device of claim 16, wherein second to Nth PWM pulses from among the plurality of PWM pulses respectively overlap the first to Mth sweep pulses.

18. The display device of claim 16, wherein the light emitting element does not emit light when the first PWM pulse has the gate-on voltage.

19. A display device comprising:

a PWM line configured to receive a PWM signal;

a PAM line configured to receive a PAM signal;

a first data line configured to receive a first data voltage;

a second data line configured to receive a second data voltage; and a subpixel including a light emitting element, wherein the subpixel is configured to:

supply a control current to a node according to the first data voltage when the PWM signal has a gate-on voltage;

generate a driving current according to the second data voltage when the PAM signal has the gate-on voltage; and supply the driving current to the light emitting element according to a voltage of the node when the PAM signal has the gate-on voltage, and wherein one frame period comprises:

a first period in which the light emitting element of the subpixel does not emit light, and during which the PWM signal has the gate-on voltage and the PAM signal has a gate-off voltage; and a second period in which the light emitting element of the subpixel emits light, and during which the PWM signal and PAM signal have the gate-on voltage.

* * * * *